(12) United States Patent
Morita et al.

(10) Patent No.: US 11,716,146 B2
(45) Date of Patent: Aug. 1, 2023

(54) OPTICAL COMMUNICATION APPARATUS, OPTICAL COMMUNICATION METHOD, AND OPTICAL COMMUNICATION SYSTEM

(71) Applicant: SONY GROUP CORPORATION, Tokyo (JP)

(72) Inventors: Hiroshi Morita, Tokyo (JP); Kazuaki Toba, Tokyo (JP); Masanari Yamamoto, Tokyo (JP); Yusuke Oyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 127 days.

(21) Appl. No.: 17/434,246

(22) PCT Filed: Feb. 18, 2020

(86) PCT No.: PCT/JP2020/006380
§ 371 (c)(1),
(2) Date: Aug. 26, 2021

(87) PCT Pub. No.: WO2020/184094
PCT Pub. Date: Sep. 17, 2020

(65) Prior Publication Data
US 2022/0149942 A1    May 12, 2022

(30) Foreign Application Priority Data

Mar. 8, 2019  (JP) ................................ 2019-042477
Jun. 4, 2019  (JP) ................................ 2019-104082

(51) Int. Cl.
*H04B 10/2581*   (2013.01)
*G02B 6/32*      (2006.01)
*H04B 10/40*     (2013.01)

(52) U.S. Cl.
CPC .......... *H04B 10/2581* (2013.01); *G02B 6/32* (2013.01); *H04B 10/40* (2013.01)

(58) Field of Classification Search
CPC ....... H04B 10/2581; H04B 10/40; G02B 6/32
(Continued)

(56) References Cited

U.S. PATENT DOCUMENTS

| 8,879,920 B2 * | 11/2014 | Lumineau | ........... H04J 14/0279 |
| | | | 398/143 |
| 2004/0105677 A1 * | 6/2004 | Hamada | ................. G02F 1/313 |
| | | | 398/79 |

(Continued)

FOREIGN PATENT DOCUMENTS

| CN | 1957277 A  | 5/2007 |
| EP | 1757964 A1 | 2/2007 |

(Continued)

OTHER PUBLICATIONS

International Search Report and Written Opinion of PCT Application No. PCT/JP2020/006380, dated May 19, 2020, 09 pages of ISRWO.

*Primary Examiner* — Dalzid E Singh
(74) *Attorney, Agent, or Firm* — Chip Law Group

(57) ABSTRACT

To relax the accuracy with respect to a positional deviation, and thus to reduce costs.
An optical waveguide is included that performs propagation only in a reference mode at a first wavelength. Communication is performed using light that has a second wavelength and includes a component of at least a first order mode in addition to a component of the reference mode. Here, the second wavelength is a wavelength that enables the optical waveguide to perform propagation in at least the first order mode in addition to the reference mode. For example, a light (Continued)

path adjuster that adjusts a light path such that input light is guided to a core of the optical waveguide, is further included.

17 Claims, 37 Drawing Sheets

(58) Field of Classification Search
USPC .......................................................... 398/139
See application file for complete search history.

(56) References Cited

U.S. PATENT DOCUMENTS

| | | |
|---|---|---|
| 2004/0184756 A1 | 9/2004 | Hanashima et al. |
| 2008/0193082 A1 | 8/2008 | Hamada |
| 2013/0148963 A1* | 6/2013 | Cvijetic .................. H04J 14/04 398/45 |
| 2014/0140694 A1* | 5/2014 | Zhou ...................... H04J 14/021 398/44 |
| 2015/0030325 A1* | 1/2015 | Chang ................ H04B 10/2581 398/44 |
| 2016/0202142 A1* | 7/2016 | Wang .................. G01M 11/3109 356/73.1 |
| 2019/0222309 A1 | 7/2019 | Gross et al. |

FOREIGN PATENT DOCUMENTS

| | | |
|---|---|---|
| JP | 2004-286959 A | 10/2004 |
| JP | 2005-049768 A | 2/2005 |
| WO | 2005/114278 A1 | 12/2005 |
| WO | 2017/056889 A1 | 4/2017 |
| WO | 2018/027267 A1 | 2/2018 |

* cited by examiner

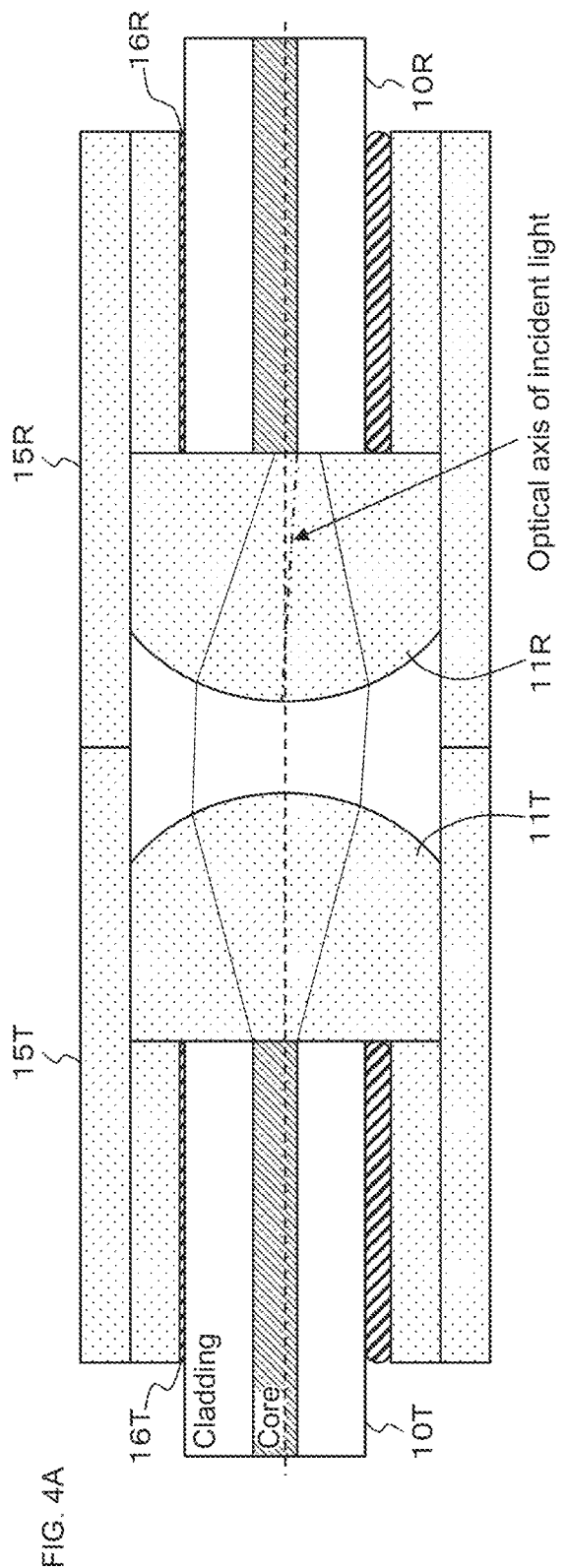
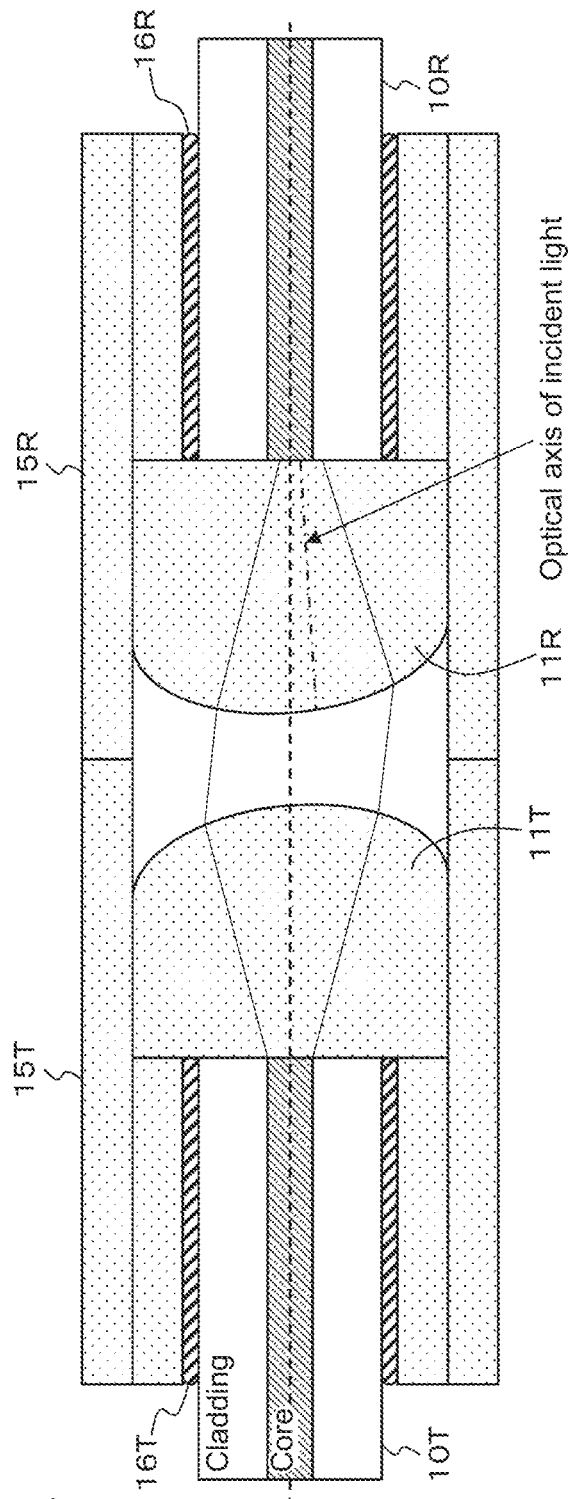

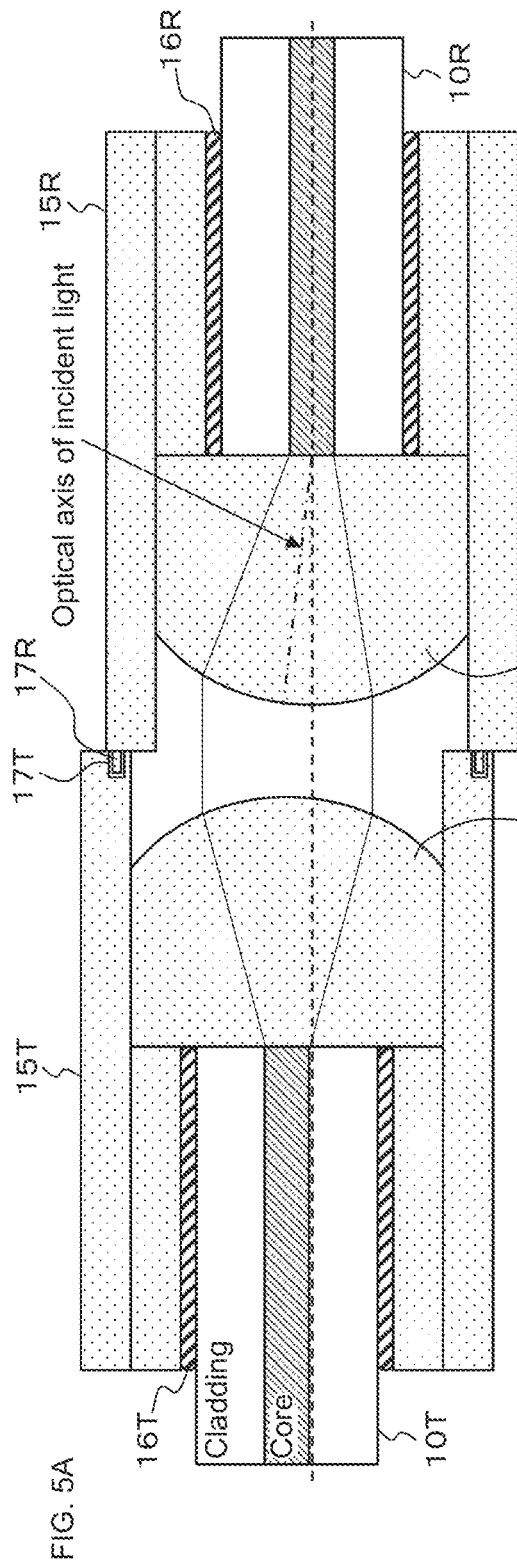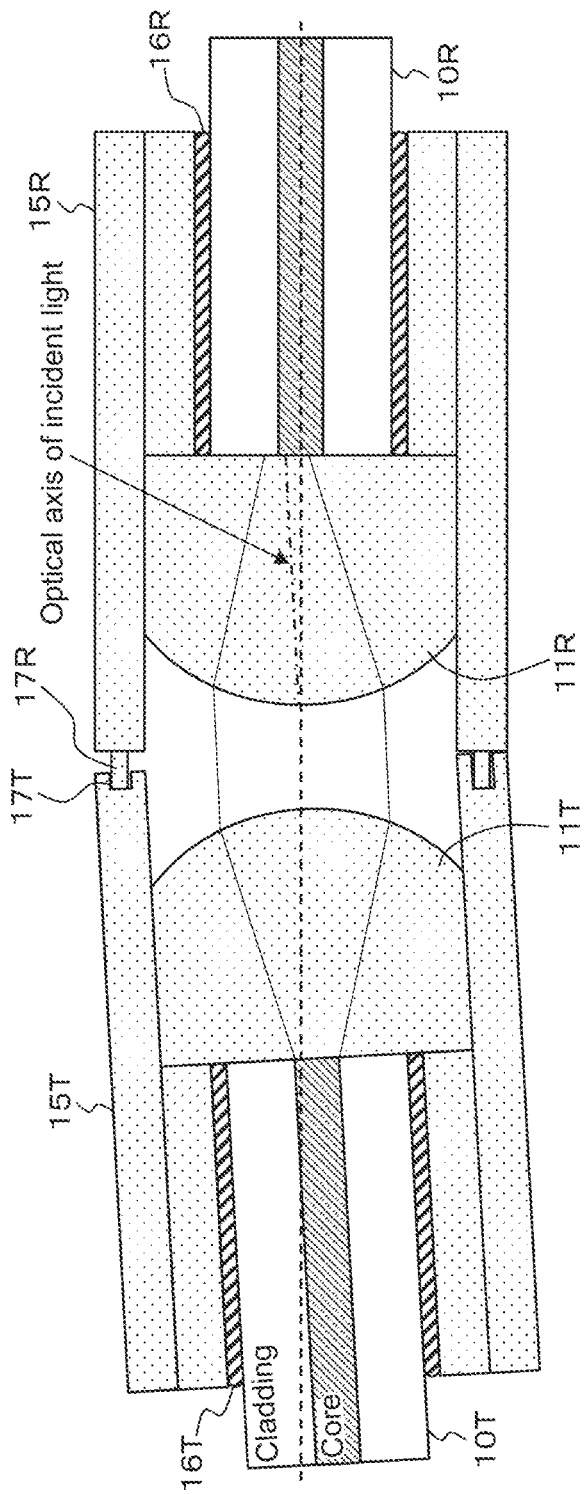

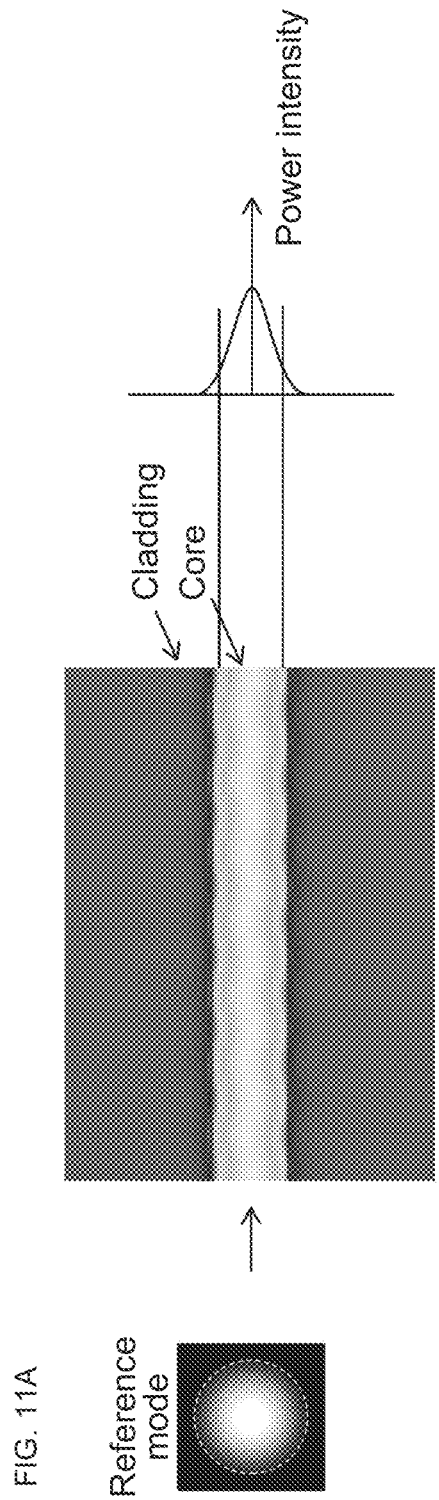
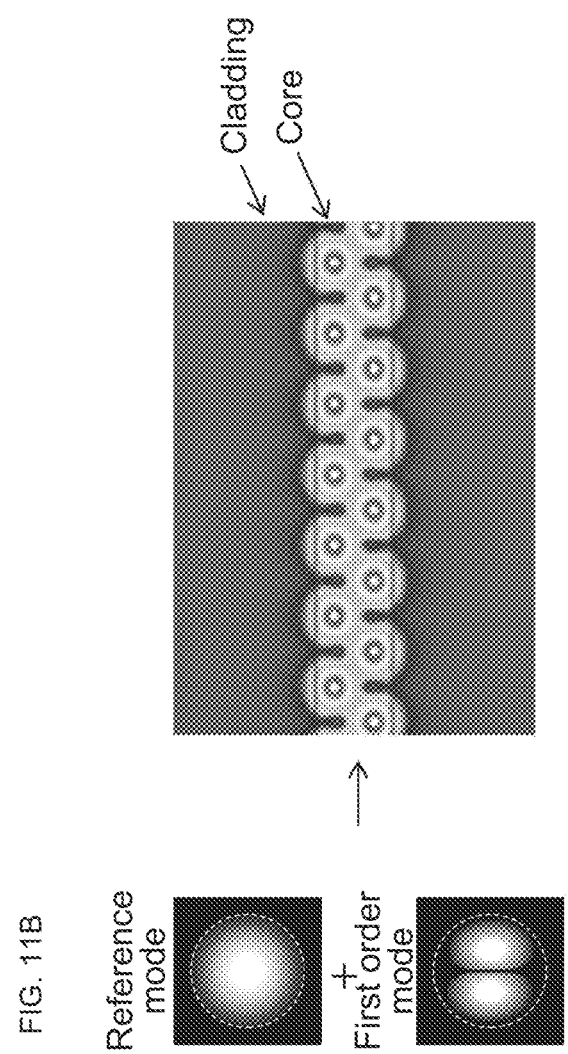
FIG. 11A
FIG. 11B

OPTICAL COMMUNICATION APPARATUS, OPTICAL COMMUNICATION METHOD, AND OPTICAL COMMUNICATION SYSTEM

CROSS REFERENCE TO RELATED APPLICATIONS

This application is a U.S. National Phase of International Patent Application No. PCT/JP2020/006380 filed on Feb. 18, 2020, which claims priority benefit of Japanese Patent Application No. JP 2019-042477 filed in the Japan Patent Office on Mar. 8, 2019 and Japanese Patent Application No. JP 2019-104082 filed in the Japan Patent Office on Jun. 4, 2019. Each of the above-referenced applications is hereby incorporated herein by reference in its entirety.

TECHNICAL FIELD

The present technology relates to an optical communication apparatus, an optical communication method, and an optical communication system. In particular, the present technology relates to, for example, an optical communication apparatus that makes it possible to relax the accuracy with respect to a positional deviation.

BACKGROUND ART

An optical communication performed by spatial coupling (for example, refer to Patent Literature 1) has been known in the past. Due to a positional deviation, the optical communication has significant losses of optical power, in particular, in a single-mode fiber. This makes great demands for the accuracy of a component in order to prevent a positional deviation. This results in an increase in costs.

CITATION LIST

Patent Literature

Patent Literature 1: WO2017/056889

DISCLOSURE OF INVENTION

Technical Problem

An object of the present technology is to relax the accuracy with respect to a positional deviation, and thus to reduce costs.

Solution to Problem

A concept of the present technology provides an optical communication apparatus that includes an optical waveguide that performs propagation only in a reference mode at a first wavelength, the optical communication apparatus performing communication using light that has a second wavelength and includes a component of at least a first order mode in addition to a component of the reference mode, the second wavelength being a wavelength that enables the optical waveguide to perform propagation in at least the first order mode in addition to the reference mode.

In the present technology, the optical waveguide that performs propagation only in a reference mode at a first wavelength is included. For example, the optical waveguide may be an optical fiber or a silicon optical waveguide. Further, for example, the first wavelength may be a wavelength at which a wavelength dispersion is zero. Furthermore, for example, the first wavelength may be a wavelength of between 300 nm and 5 µm. Moreover, for example, the first wavelength may be a wavelength in a 1310 nm band or a wavelength in a 1550 nm band.

Further, in the present technology, communication is performed using light that has the second wavelength and includes the component of at least the first order mode in addition to the component of the reference mode. Here, the second wavelength is a wavelength that enables the optical waveguide to perform propagation in at least the first order mode in addition to the reference mode. In this case, the second wavelength is shorter than the first wavelength. For example, the second wavelength may be a wavelength in an 850 nm band.

As described above, in the present technology, the optical waveguide that performs propagation only in the reference mode at the first wavelength is included, and communication is performed using light that has the second wavelength and includes the component of at least the first order mode in addition to the component of the reference mode, the second wavelength enabling the optical waveguide to perform propagation in at least the first order mode in addition to the reference mode.

Thus, communication is performed using light of the second wavelength, and the component of at least the first order mode generated due to a deviation with respect to an optical axis is propagated through the optical waveguide together with the component of the reference mode. This results in being able to reduce a loss of coupling of optical power due to the deviation with respect to an optical axis. Further, in this case, communication is performed using light that includes the component of at least the first order mode in addition to the component of the reference mode, and this makes it possible to improve, depending on the direction of a deviation of light entering the optical waveguide from the optical axis, the efficiency in coupling of optical power when there is the deviation, compared to when communication is performed using light that uses the second wavelength but only includes the component of the reference mode.

Note that, in the present technology, for example, a light path adjuster that adjusts a light path such that input light is guided to the core of the optical waveguide, may be further included. In this case, for example, the light path adjuster may adjust the light path due to light being refracted by a lens. Further, in this case, for example, the light path adjuster may adjust the light path due to light being reflected off a light path adjusting member that includes a tapered surface in which a diameter is gradually decreased toward an entrance side of the optical waveguide. Furthermore, in this case, for example, the light path adjuster may be provided between the core and cladding at an entrance end of the optical waveguide, and the light path adjuster may adjust the light path using a light path adjusting member that includes a surface in contact with the cladding, the surface being a surface in which a diameter sized equally to a diameter of the core is gradually increased, the light path adjusting member having a refractive index that is gradually changed in a direction from the core to the cladding, from a refractive index equal to a refractive index of the core to a refractive index equal to a refractive index of the cladding. Moreover, in this case, for example, the light path adjuster may be provided on the entrance side of the optical waveguide, and the light path adjuster may adjust the light path using a light path adjusting member that has a refractive index having a gradation structure in which the light path adjusting member has, on an optical axis, a refractive index equal to a refractive index of the core of the optical waveguide, and the light path adjusting member has a refractive index lower at a position, in the light path adjusting member, that is situated vertically further away from the optical axis.

When a light path is adjusted such that input light is guided to the core of the optical waveguide, as described above, this makes it possible to reduce a loss of coupling of optical power that is generated due to communication being performed using light that includes a component of at least a first order mode in addition to a component of a reference mode.

Further, another concept of the present technology provides an optical communication system that includes a reception section that includes an optical waveguide that performs propagation only in a reference mode at a first wavelength, and a transmission section from which light that has a second wavelength enters the optical waveguide of the reception section, the light including a component of at least a first order mode in addition to a component of the reference mode, the second wavelength being a wavelength that enables the optical waveguide to perform propagation in at least the first order mode in addition to the reference mode.

In the present technology, the reception section and the transmission section are included. The reception section includes the optical waveguide that performs propagation only in the reference mode at the first wavelength. From the transmission section, light that has the second wavelength and includes the component of at least the first order mode in addition to the component of the reference mode enters the optical waveguide of the reception section. Here, the second wavelength is a wavelength that enables the optical waveguide to perform propagation in at least the first order mode in addition to the reference mode. For example, the transmission section may be a receptacle of a transmitter, or a plug of a cable.

As described above, in the present technology, the reception section includes the optical waveguide that performs propagation only in the reference mode at the first wavelength. From the transmission section, light that has the second wavelength and includes the component of at least the first order mode in addition to the component of the reference mode enters the optical waveguide, the second wavelength enabling the optical waveguide to perform propagation in at least the first order mode in addition to the reference mode. This results in being able to reduce a loss of coupling of optical power due to a deviation with respect to an optical axis.

BRIEF DESCRIPTION OF DRAWINGS

FIGS. 4A and 4B illustrate examples of the optical communication performed by the spatial coupling.

FIGS. 5A and 5B illustrate examples of the optical communication performed by the spatial coupling.

FIGS. 11A and 11B illustrate simulations of a distribution of the intensity of light transmitted through an optical fiber.

MODE(S) FOR CARRYING OUT THE INVENTION

Embodiments for carrying out the present technology (hereinafter referred to as "embodiments") will now be described below. Note that the description is made in the following order.
1. Embodiments
2. Modifications

1. Embodiments

[Basic Description of Present Technology]

Figure 1:
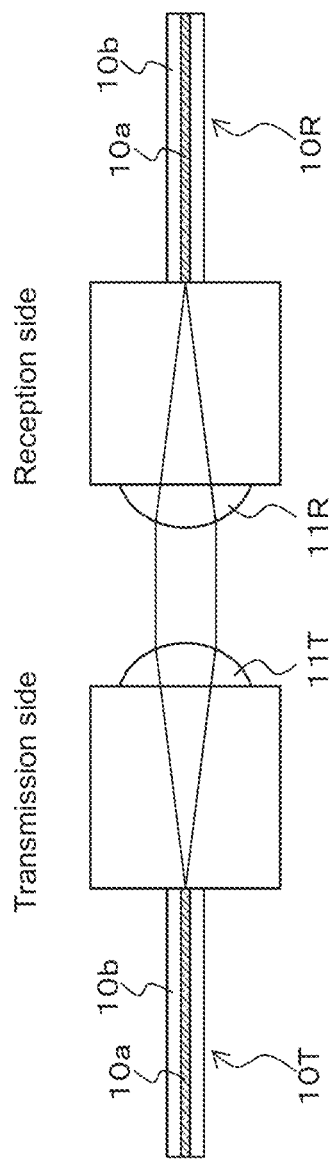
FIG. 1 illustrates an outline of an optical communication performed by spatial coupling.

First, a technology related to the present technology is described. FIG. 1 illustrates an outline of an optical communication performed by spatial coupling. In this case, light exiting an optical fiber 10T on the transmission side is formed into collimated light by a lens 11T on the transmission side, and the collimated light exits the lens 11T. Then, the collimated light is collected by a lens 11R on the reception side, and enters an optical fiber 10R on the reception side. Due to a positional deviation, the optical communication has significant losses of optical power, in particular, in a single-mode fiber. Note that the optical fibers 10T and 10R each have a two-layer structure including a core 10a and cladding 10b, the core 10a being a center portion that serves as a light path, the cladding 10b covering a peripheral surface of the core 10a.

Next, a basic idea about a mode is described. In order to perform propagation through an optical fiber in a single mode, there is a need to determine parameters for the fiber, such as a refractive index and a core diameter, such that there is only one mode.

Figure 2B:
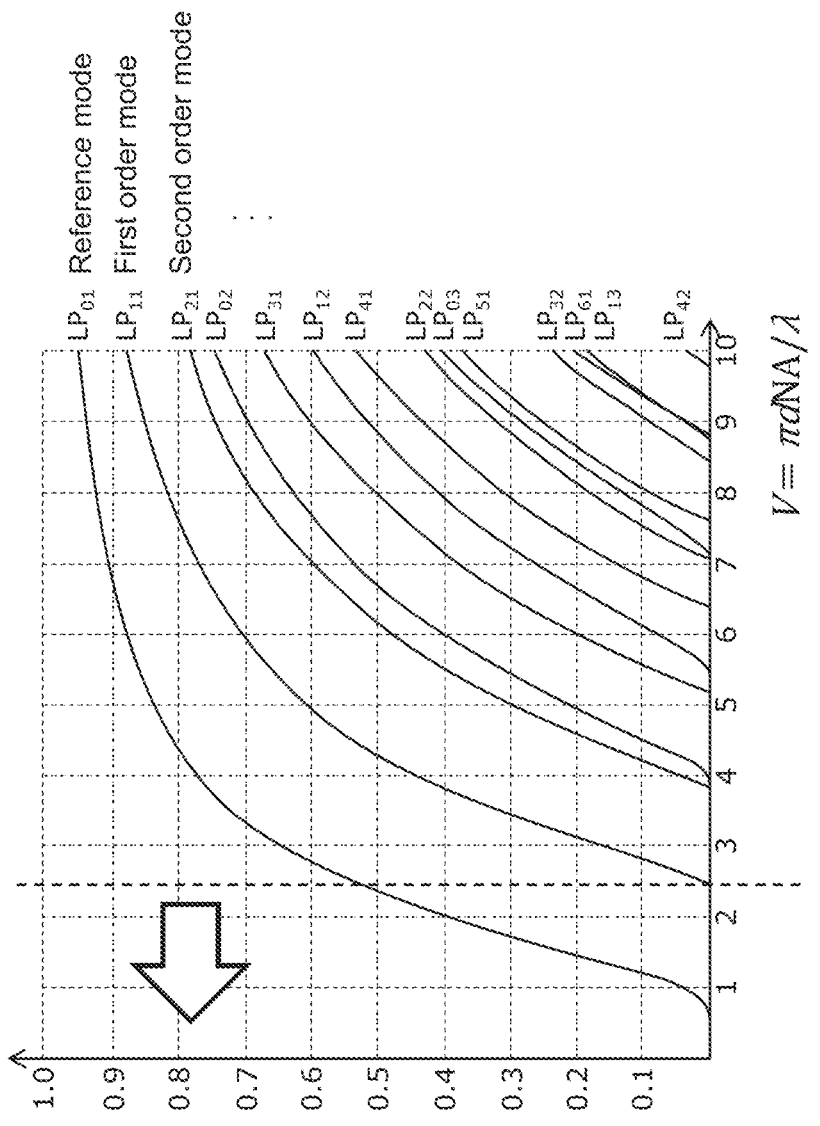
FIGS. 2A and 2B is a are diagrams illustrating a basic structure of an optical fiber and a linearly polarized mode (LPml mode) for a step-index optical fiber.
Figure 2A:
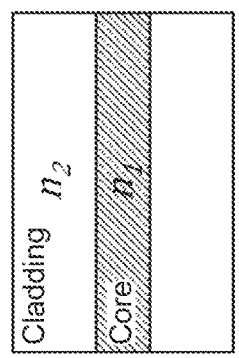

FIG. 2A illustrates a basic structure of an optical fiber. The optical fiber has a structure in which a center portion called a "core" is covered with a layer called "cladding". In this case, a refractive index n1 of the core is set high, and a refractive index n2 of the cladding is set low. Light in a state of being confined in the core propagates.

FIG. 2B illustrates a linearly polarized mode (LPml mode) for a step-index optical fiber, where a normalized propagation constant b is given in the form of a function of a normalized frequency V. The vertical axis represents the normalized propagation constant b, where b=0 when propagation is not performed in a certain mode (a certain mode is interrupted), and b has a value closer to 1 as a larger amount of optical power is confined in a core (can be propagated). The horizontal axis represents the normalized frequency V, and the normalized frequency V can be represented by Formula (1) indicated below. Here, d is a core diameter, NA is a numerical aperture, and λ is a light wavelength.

$$V = \pi d N A / \lambda \quad (1)$$

For example, when V=2.405, LP11 is interrupted, and thus LP01 is a sole existing mode. Thus, a state in which V is equal to or less than 2.405 corresponds to a state of a single mode. Here, LP01 is a reference mode (zero order mode), and subsequently, LP11, LP21, . . . are a first order mode, a second order mode . . . , respectively.

Figure 3A:
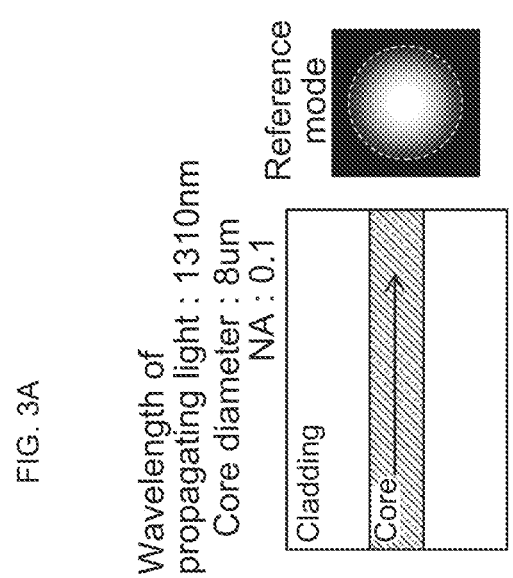
FIGS. 3A and 3B is a are diagrams used to discuss a normalized frequency V in the case of 1310 nm, which is a typical wavelength for a single mode.

For example, the normalized frequency V in the case of 1310 nm, as illustrated in FIG. 3A, is discussed, where 1310 nm is a typical wavelength for the single mode. Here, when the core diameter d is 8 μm and the numerical aperture NA is 0.1, which respectively represent typical parameters for a 1310 nm optical fiber, and when the wavelength of light that propagates through the fiber is 1310 nm, V=1.92 is obtained using Formula (1).

Figure 3B:
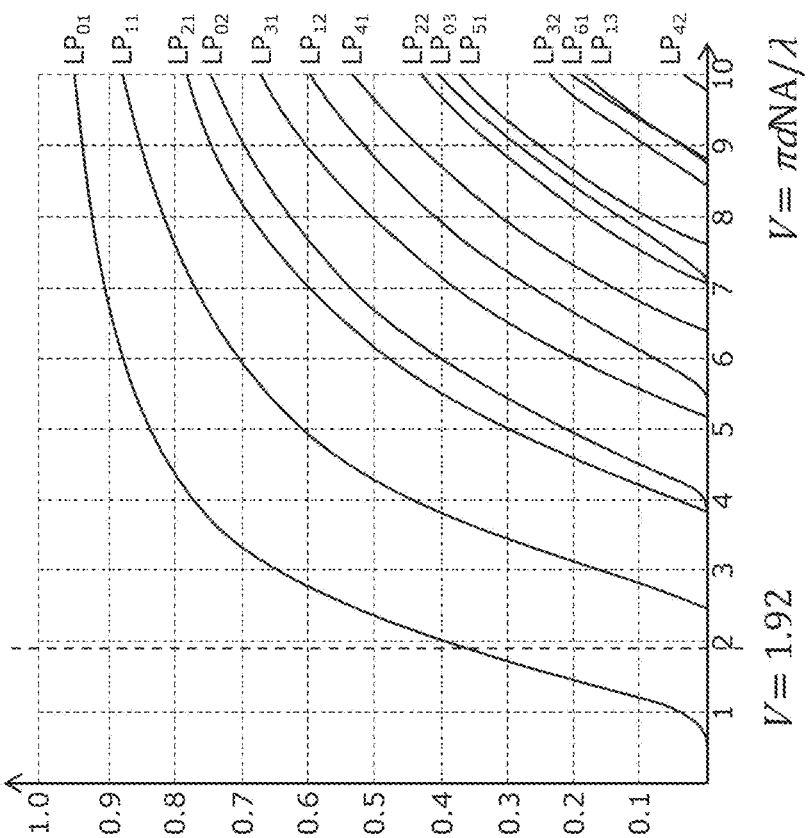

Thus, the normalized frequency V is equal to or less than 2.405, as illustrated in FIG. 3B. Consequently, propagation is performed only in the reference mode LP01, and this results in propagation being performed in a single mode. Here, the number of modes in which propagation can be performed is increased as the core diameter becomes larger. Note that, for example, a typical multimode fiber has a core diameter of, for example, 50 μm, and this results in propagation being performed in several hundred modes.

In the case of the optical communication performed by spatial coupling as illustrated in FIG. 1, there is a need to strictly align an optical coupling portion on the transmission side with an optical coupling portion on the reception side in the single mode, since the core diameter for the single mode is small. This makes greater demands for the accuracy in order to perform an accurate alignment with respect to an optical axis.

Typically, a precision component is used or a portion for inputting light to an optical fiber is processed to facilitate an insertion of light into a core of a fiber, in order to solve the issue described above. However, the precision component is expensive, and the necessity for processing results in an increase in costs for the processing. Thus, a connector and a system that are used for a single-mode communication are generally expensive.

FIGS. 4A, 4B, 5A and 5B illustrate examples of a factor of a reduction in the accuracy in optical-axis alignment. A deviation with respect to an optical axis occurs due to an amount of a fixation material 16T and an amount of a fixation material 16R not being the same as each other, as illustrated in, for example, FIG. 4A, the fixation materials 16T and 16R being used to fix ferrules 15T and 15R to the optical fibers 10T and 10R. Further, a deviation with respect to an optical axis occurs due to lack of accuracy in producing the lenses 11T and 11R, as illustrated in, for example, FIG. 4B.

Further, a deviation with respect to an optical axis occurs due to lack of accuracy of an alignment mechanism (a concave portion 17T and a convex portion 17R) that is provided to the ferrules 15T and 15R, as illustrated in FIGS. 5A and 5B. Note that the convex portion 17R illustrated in FIGS. 5A and 5B may be a pin.

The present technology makes it possible to relax the accuracy with respect to a deviation with respect to an optical axis, and thus to reduce costs. In the present technology, first, an optical fiber can perform propagation only in a reference mode at a first wavelength, and communication is performed using light of a second wavelength that enables the optical fiber to perform propagation in at least the first order mode in addition to the reference mode.

Figures 6A, 6B:
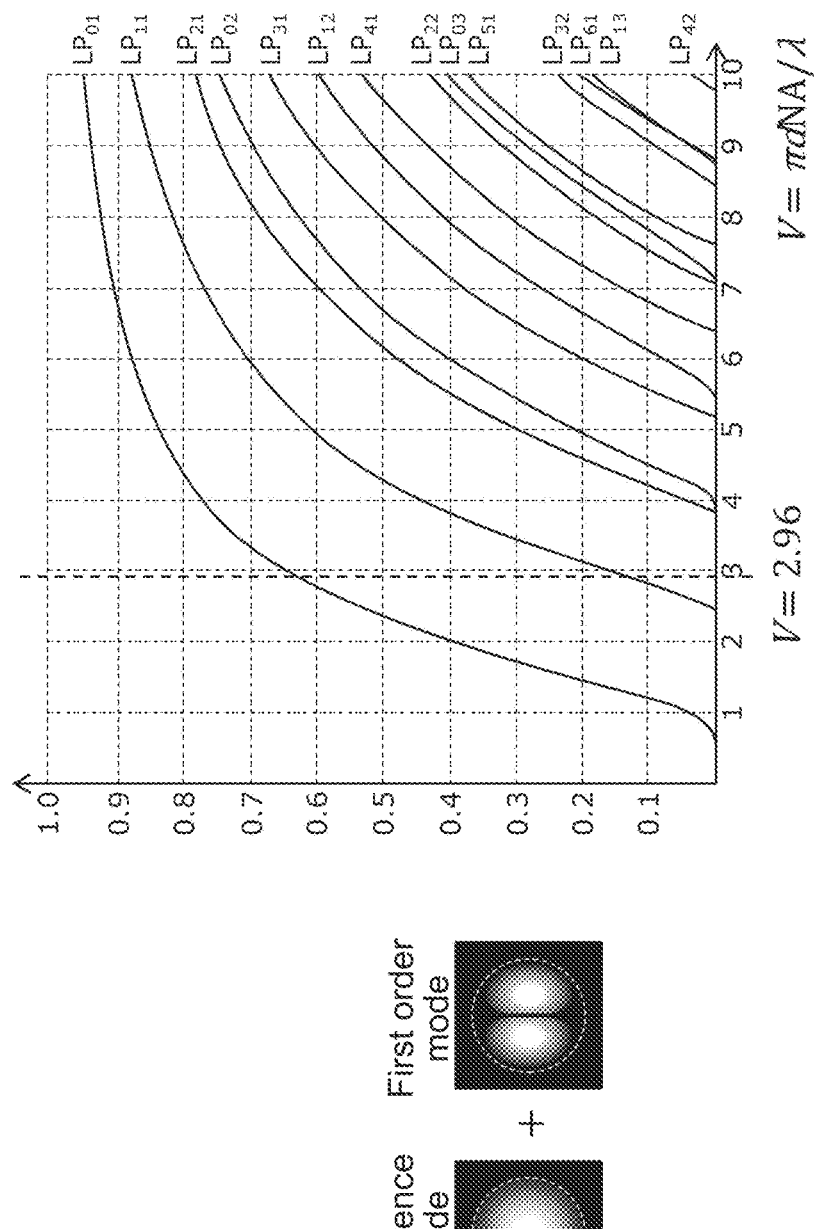
FIGS. 6A and 6B is a are diagrams describing the fact that there may be a reference mode LP01 and a first order mode LP11 when light of a wavelength of 850 nm is input to a 1310 nm single-mode fiber.

For example, when light of a wavelength of 850 nm, instead of 1310 nm, is input to an optical fiber with the same condition as FIG. 3A, the normalized frequency V=2.96, as illustrated in FIG. 6B. Thus, there may be the reference mode LP01 and the first order mode LP11, as illustrated in FIG. 6A.

Figure 7A:
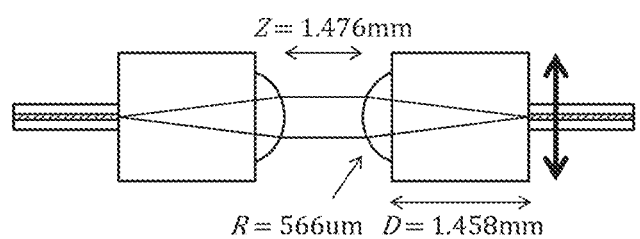
FIGS. 7A and 7B is a are diagrams used to discuss the case in which a deviation with respect to an optical axis occurs under the condition that there is only the reference mode LP01 for input light.
Figure 7B:
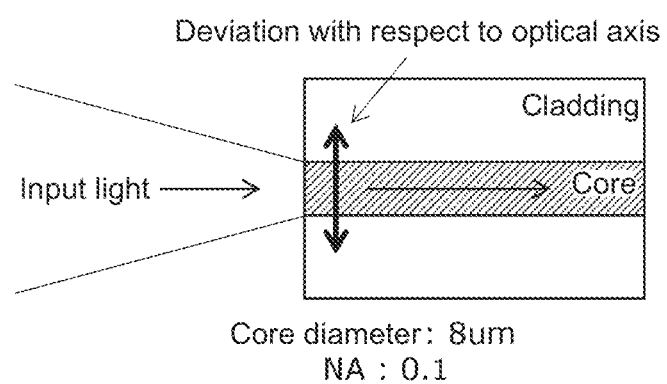

The following case is discussed: under the condition that there is only the reference mode LP01 for input light when an optical system as illustrated in FIG. 7A is formed, the position of an optical fiber on the reception side is shifted in a direction vertical to an optical axis (refer to arrows in FIGS. 7A and 7B), that is, a deviation with respect to an optical axis occurs.

Figure 8:
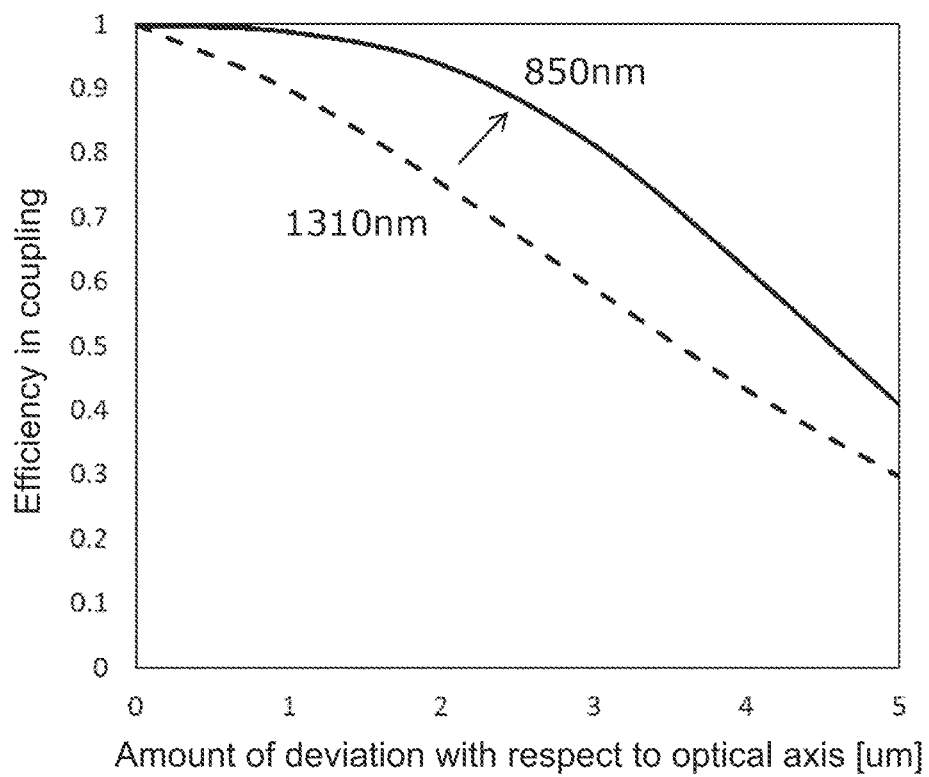
FIG. 8 is a graph of a result of simulating amounts of loss when a wavelength of input light is 1310 nm and when the wavelength of the input light is 850 nm.

FIG. 8 is a graph of a result of simulating the efficiency in coupling of optical power in the case described above. The horizontal axis represents an amount of a deviation with respect to an optical axis, and the vertical axis represents the efficiency in coupling. When there is no deviation, 100% of power propagates through an optical fiber, where the efficiency in coupling is 1. Further, when, for example, only 50% of the power in input light propagates through the optical fiber, the efficiency in coupling is 0.5.

When the case in which a wavelength of the input light is 1310 nm and the case in which the wavelength of the input light is 850 nm are compared, it is understood, from the comparison, that better characteristics are exhibited in the case of 850 nm. The reason is that propagation is performed only in the reference mode in the case of 1310 nm, whereas propagation is performed in the first order mode in addition to the reference mode in the case of 850 nm (refer to FIG. 6A).

Figure 9A:
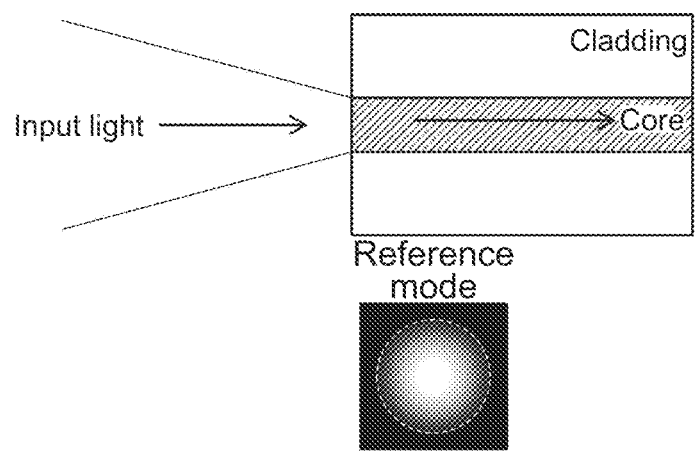
FIGS. 9A and 9B illustrate the fact that there is only a reference mode for input light when there is no deviation with respect to an optical axis, whereas a portion of the reference mode is converted into a first order mode when there is a deviation with respect to an optical axis.
Figure 9B:
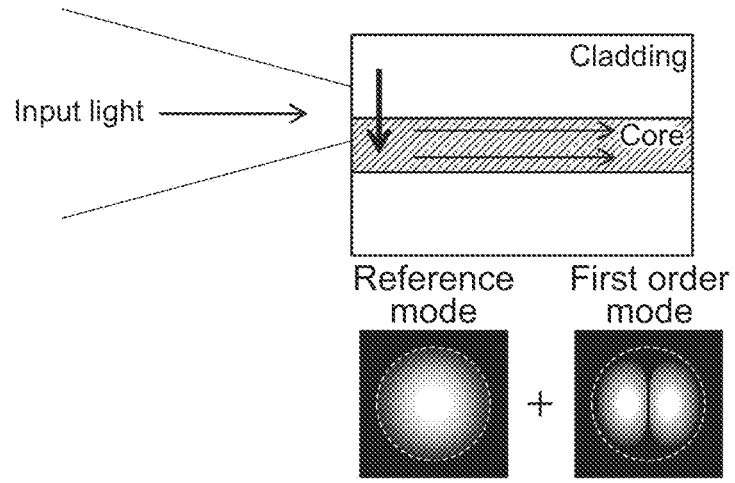

In other words, when there is no deviation with respect to an optical axis, there is only a reference mode for input light, as illustrated in FIG. 9A. On the other hand, when there is a deviation with respect to an optical axis, a portion of the reference mode is converted into a first order mode using a phase difference caused due to a difference in refractive index between cladding and a core, as illustrated in FIG. 9B. Propagation is not allowed to be performed in the first order mode in the case of 1310 nm, whereas propagation can also be performed in the first order mode in the case of 850 nm. Thus, better characteristics are exhibited in the case of 850 nm.

Figure 10:
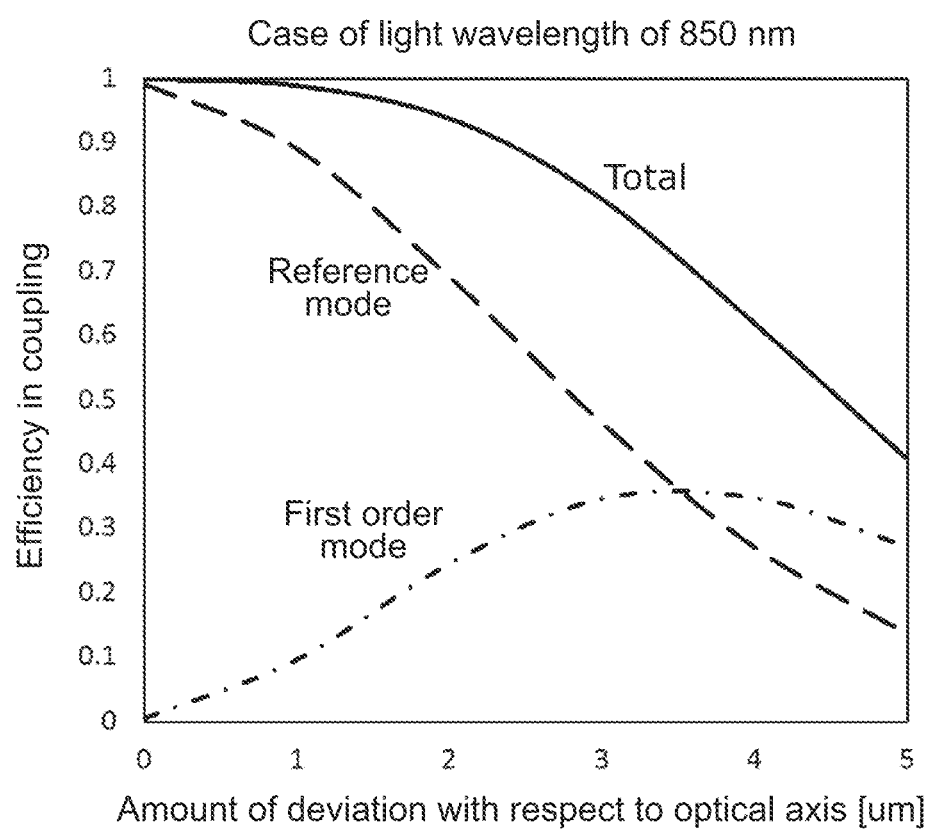
FIG. 10 is a graph describing the fact that the reference mode is converted into the first order mode according to the deviation.

In a graph of FIG. 10, a component of a reference mode (zero order mode) and a component of a first order mode are separately given, and the sum of them is represented by a curve Total. It is understood that the reference mode is converted into the first order mode according to the deviation since there is only the reference mode for input light. On the other hand, in the case of 1310 nm, there is a simple reduction in reference mode, as illustrated in FIG. 8, since propagation is performed only in the reference mode, as illustrated in FIG. 3A.

The case of 1310 nm and the case of 850 nm are compared with reference to FIG. 8. It is possible to relax the accuracy with respect to a positional deviation by about 1.8 times when the comparison is performed at an efficiency in coupling of 0.8 (about −1 dB), and to relax the accuracy with respect to a positional deviation by about 2.35 times when the comparison is performed at an efficiency in coupling of 0.9 (about −0.5 dB).

As described above, an optical fiber can perform propagation only in a reference mode at a first wavelength (for example, 1310 nm), and communication is performed using light of a second wavelength (for example, 850 nm) that enables the optical fiber to perform propagation in at least the first order mode in addition to the reference mode. This makes it possible to improve the efficiency in coupling of optical power.

Further, in the present technology, secondly, communication is performed using light that includes a component of at least a first order mode in addition to a component of a reference mode.

FIG. 11 illustrates simulations of a distribution of the intensity of light transmitted through an optical fiber. FIG. 11A illustrates an example in which light is transmitted that only includes a component of a reference mode. In this case, the intensity of the light is highest at the center of a core of the optical fiber, and is lower in a portion closer to cladding. FIG. 11B illustrates an example in which light is transmitted that includes components of a reference mode and a first order mode. In this case, high-intensity portions alternately appear in a certain direction and in another direction from the center of a core, upward and downward in the illustrated example.

Figure 12:
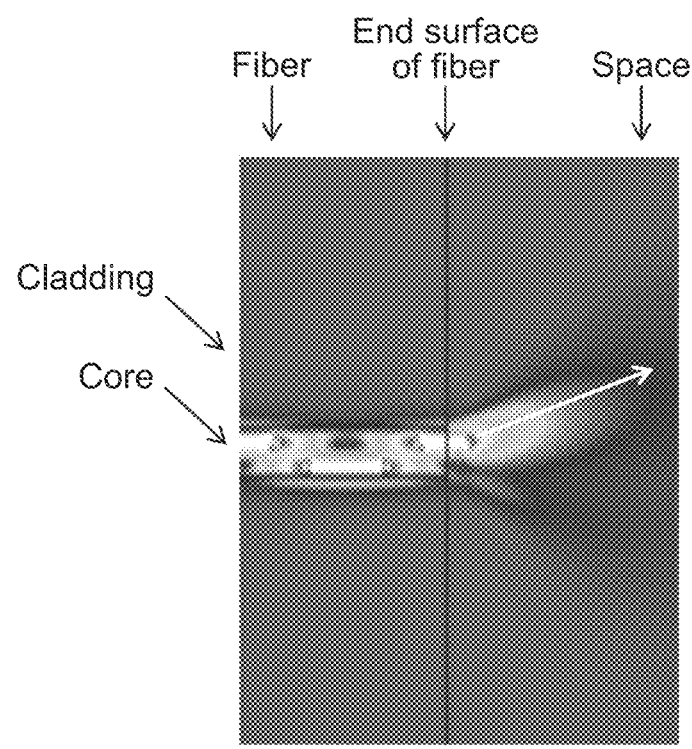
FIG. 12 is a diagram for describing an angle at which light travels when the light exits an end surface of the fiber.

In the state of FIG. 11B, light travels at a certain angle toward a portion with a higher degree of intensity from the center of the core when the light exits an end surface of the fiber, as illustrated in FIG. 12.

Figure 13A:
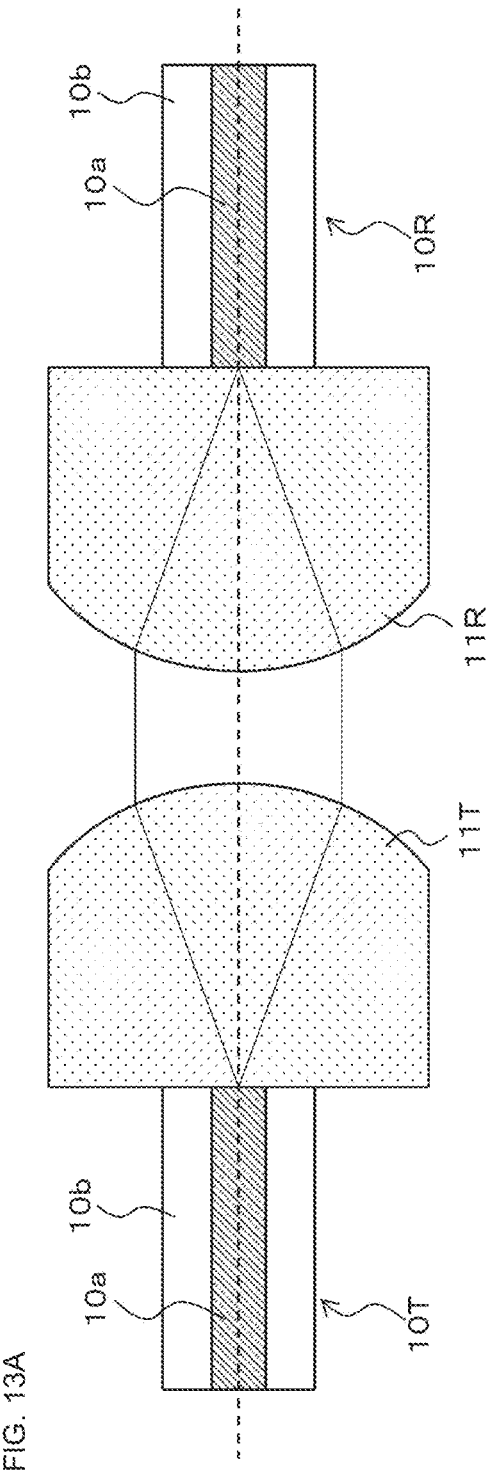
FIGS. 13A and 13B is a are diagrams for describing the optical communication performed by the spatial coupling.

The optical communication performed by the spatial coupling illustrated in FIG. 1 is discussed. As illustrated in FIG. 13A, light exiting the center of the core 10a on the transmission side is coupled to the center of the core 10a on the reception side. However, when light is transmitted that includes components of a reference mode and a first order mode, the light of which an intensity distribution moves upward from the center of the core 10a on the transmission side to become uneven, is coupled downward to the center of the core 10a on the reception side, as illustrated in FIG. 13B.

Figure 13B:
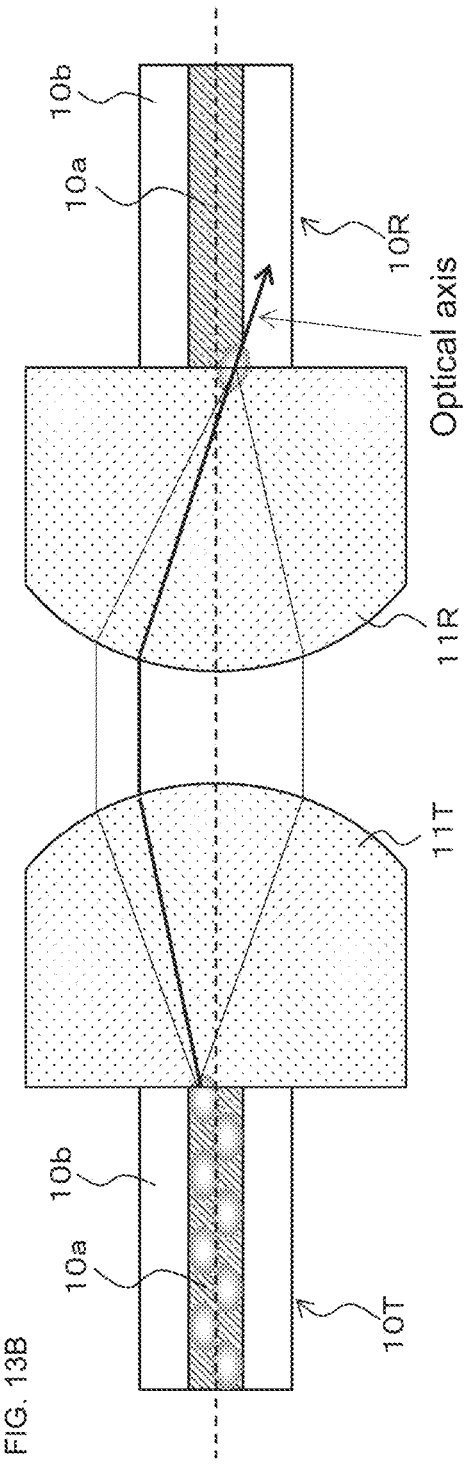
Figure 14:
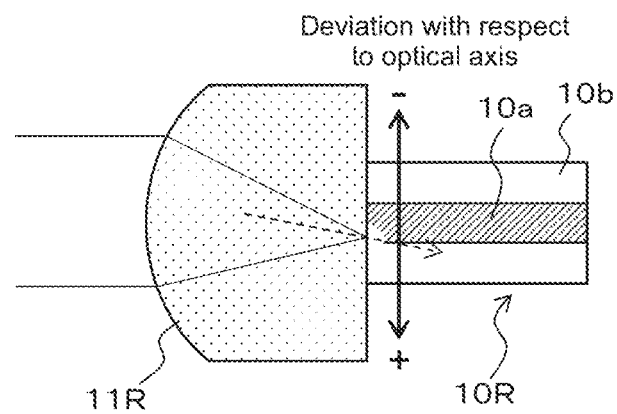
FIG. 14 is a diagram for describing a deviation with respect to an optical axis in which an optical fiber is vertically shifted with respect to a lens.

The following case is discussed: under the condition as illustrated in FIG. 13B, a deviation with respect to an optical axis in which the optical fiber 10R on the reception side is vertically shifted with respect to the lens 11R, occurs, as illustrated in FIG. 14. In this case, when the illustrated state is a state in which an amount of a deviation with respect to an optical axis is zero. When the direction of a deviation with respect to an optical axis is a positive (+) direction, a portion with a high degree of intensity of light is situated in a direction in which the light enters the core 10a of the optical fiber 10R. Thus, the light can be easily coupled to the core 10a of the optical fiber 10R. On the other hand, when the direction of a deviation with respect to an optical axis is a negative (−) direction, the core 10a of the optical fiber 10R is moved to a direction opposite to a direction in which light travels. This results in reducing the efficiency in coupling.

Figure 15:
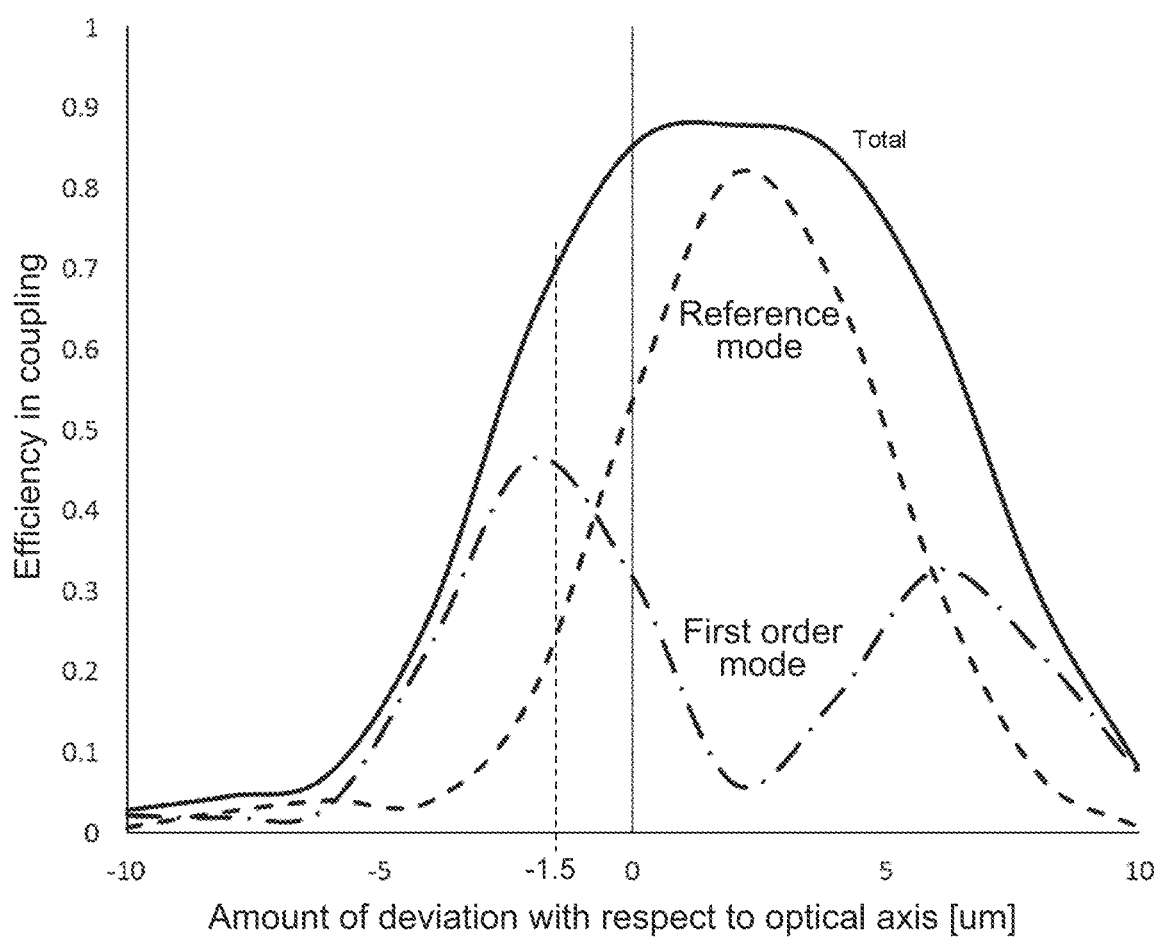
FIG. 15 is a graph of a result of simulating the efficiency in coupling of optical power.

FIG. 15 is a graph of a result of simulating the efficiency in coupling of optical power when input light (light exiting the transmission side) includes components of a reference mode and a first order mode at a ratio of one to one. The horizontal axis represents an amount of a deviation with respect to an optical axis, and the vertical axis represents the efficiency in coupling. In the illustrated example, the reference mode (zero order mode) and the first order mode are separately given, and the sum of them is represented by a curve Total. In the case in which there is only the reference mode, there is a significant reduction in efficiency in coupling when the direction of a deviation is a negative (−) direction. However, due to a component of the reference mode being converted into a component of the first order mode, the efficiency in coupling is about 0.7 when an amount of deviation is −1.5 µm.

Figure 16:
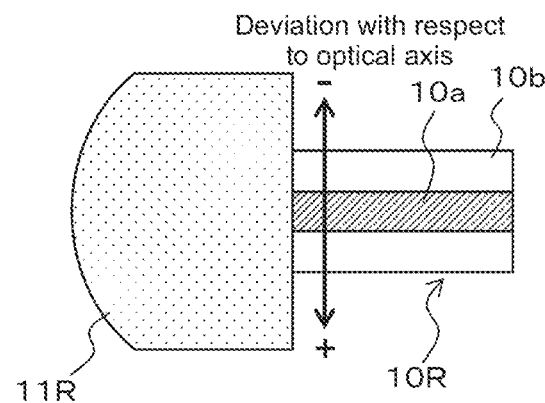
FIG. 16 is a diagram for describing a deviation with respect to an optical axis in which the optical fiber is vertically shifted with respect to the lens.

Here, the following case is discussed: for each of the case in which input light (light exiting the transmission side) only includes a component of a reference mode, and the case in which the input light includes the component of the reference mode and a component of a first order mode, a deviation with respect to an optical axis in which the optical fiber 10R on the reception side is vertically shifted with respect to the lens 11R, occurs, as illustrated in FIG. 16, in the optical communication performed by the spatial coupling illustrated in FIGS. 13A and 13B.

Figure 17:
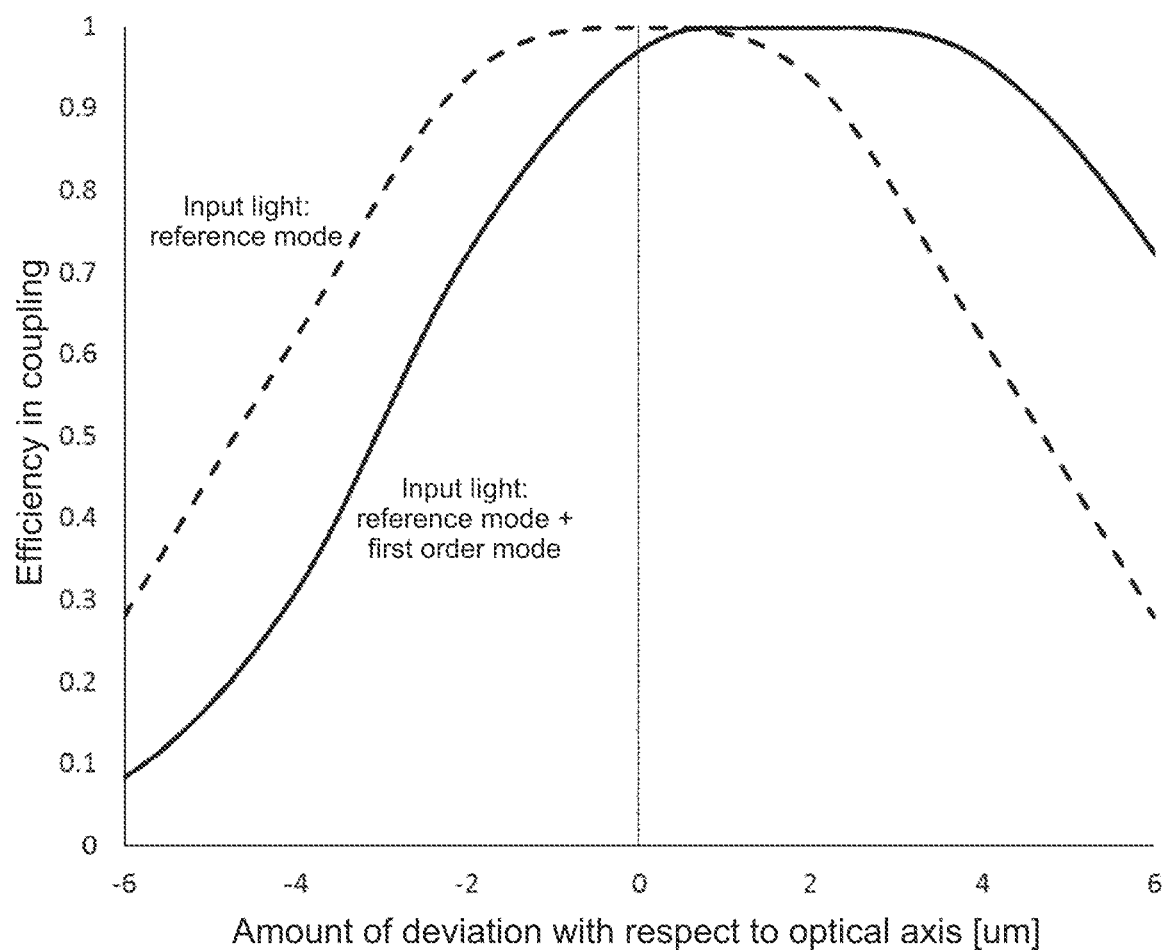
FIG. 17 is a graph illustrating a result of simulating the efficiencies in coupling of optical power.

FIG. 17 is a graph illustrating a result of simulating the efficiencies in coupling of optical power when input light only includes a component of a reference mode and when the input light includes the component of the reference mode and a component of a first order mode. The horizontal axis represents an amount of a deviation with respect to an optical axis, and the vertical axis represents the efficiency in coupling. Here, the efficiency in coupling in a portion with a highest intensity is normalized by being set to 1, in order to bring all of the references into line.

When the direction of a deviation with respect to an optical axis is a positive (+) direction, a greater efficiency in coupling is achieved when input light includes components of a reference mode and a first order mode, compared to when the input light only includes the component of the reference mode. The reason is that, when the direction of a deviation with respect to an optical axis is a positive (+) direction, light travels in a direction in which a portion of the light that has a high degree of intensity enters the core 10a of the optical fiber 10R, as described above. Thus, the light can be easily coupled to the core 10a of the optical fiber 10R.

However, when the direction of a deviation with respect to an optical axis is a negative (−) direction, the efficiency in coupling is lower when the input light includes the components of the reference mode and the first order mode, compared to when the input light only includes the component of the reference mode. The reason is that the core 10a of the optical fiber 10R is moved to a direction opposite to a direction in which light travels, as described above.

When communication is performed using light that includes a component of at least a first order mode in addition to a component of a reference mode, as described above, this makes it possible to improve, depending on the direction of a deviation with respect to an optical axis, the efficiency in coupling of optical power when there is the deviation, compared to when communication is performed using light that only includes the component of the reference mode. In this case, when designing is performed such that only an axial deviation of an optical fiber in the same direction as a direction in which input light travels can be accepted, input light that includes components of a reference mode and a first order mode has more tolerance for the axial deviation than input light that only includes the component of the reference mode.

Further, in the present technology, thirdly, when communication is performed using light that includes a component of at least a first order mode in addition to a component of a reference mode, a light path adjuster that adjusts a light path such that input light is guided to a core of an optical waveguide is included in order to improve the efficiency in coupling of optical power when there is a deviation with respect to an optical axis in a negative (−) direction.

Figure 18:
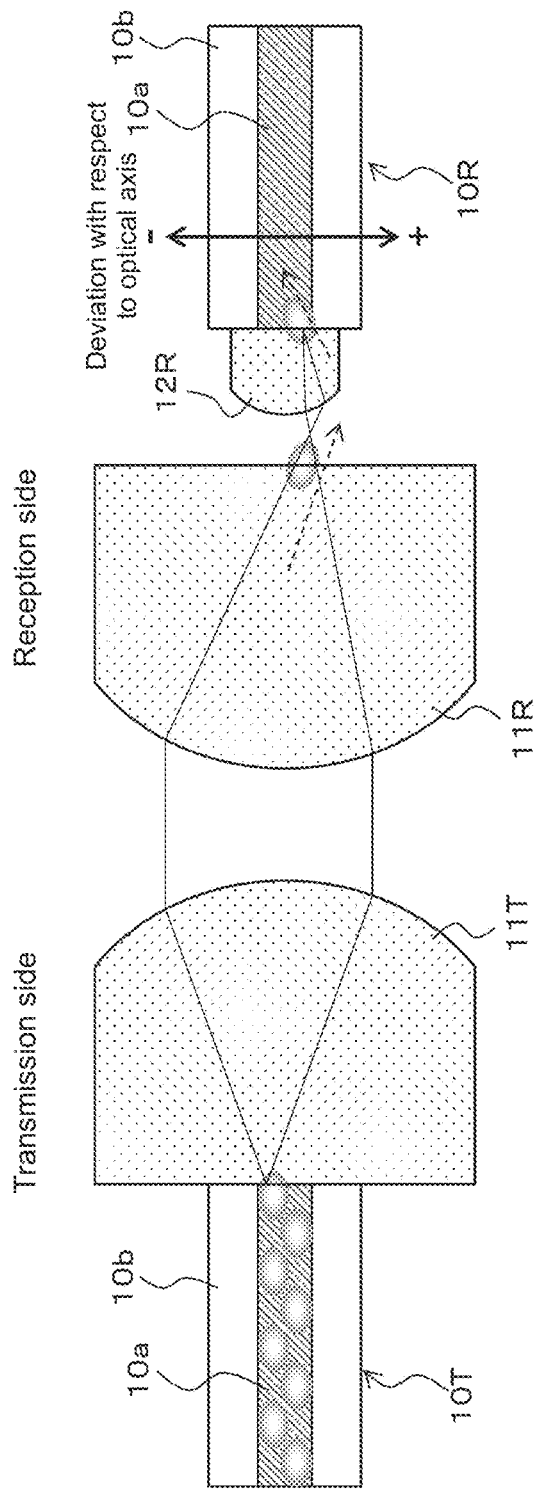
FIG. 18 illustrates an example in which a lens that is a light path adjuster is provided on an entrance side of the optical fiber.

FIG. 18 illustrates an example in which a lens (a convex lens) 12R that is a light path adjuster is provided on an entrance side of the optical fiber 10R. Such a provision of the lens 12R provides a lens effect that enables light to be headed for the center corresponding to an optical axis again when the light deviates downward from the optical axis. Accordingly, the efficiency in coupling of optical power when there is a deviation with respect to an optical axis in a negative (−) direction can be improved.

Figure 19:
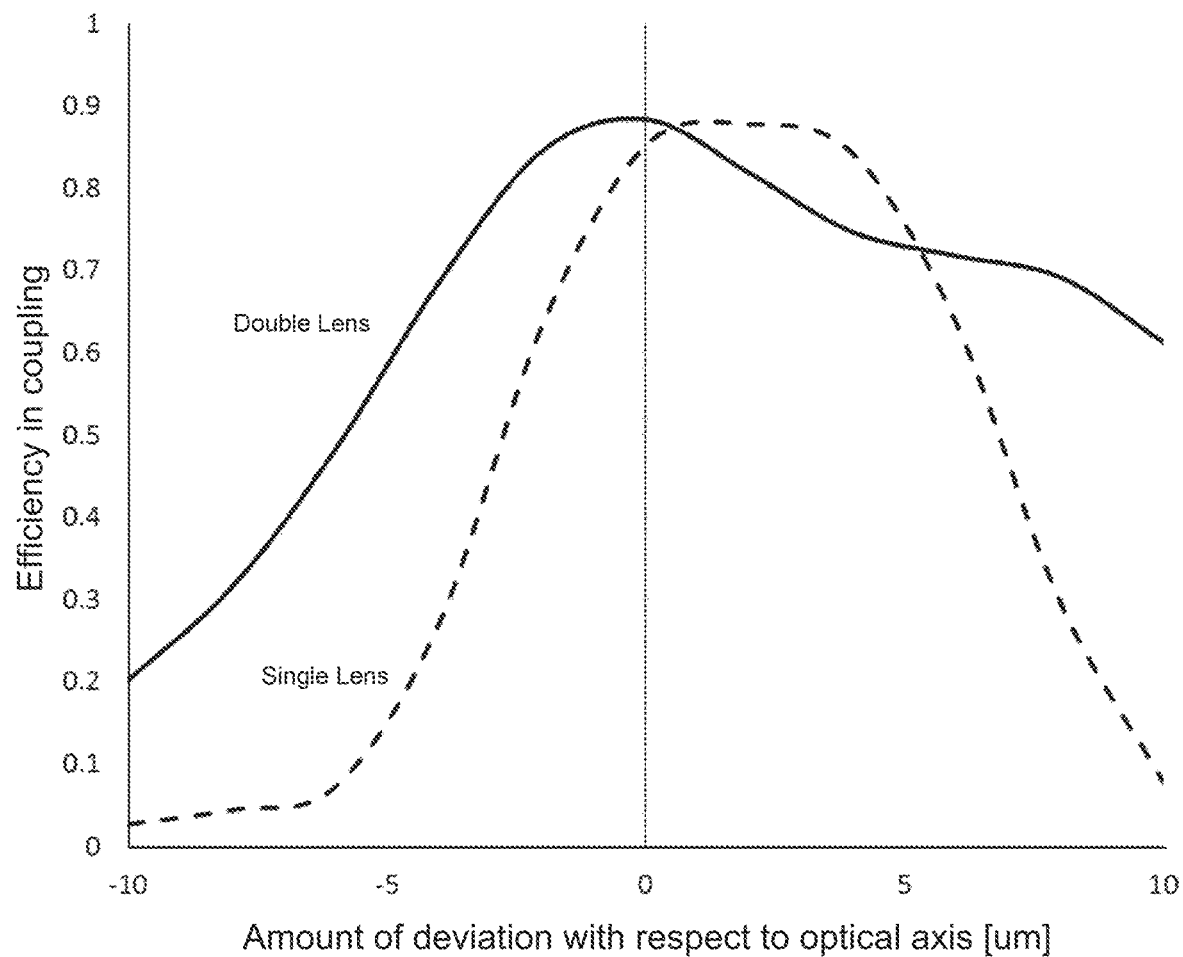
FIG. 19 is a graph illustrating a result of simulating the efficiencies in coupling of optical power.
Figure 20:
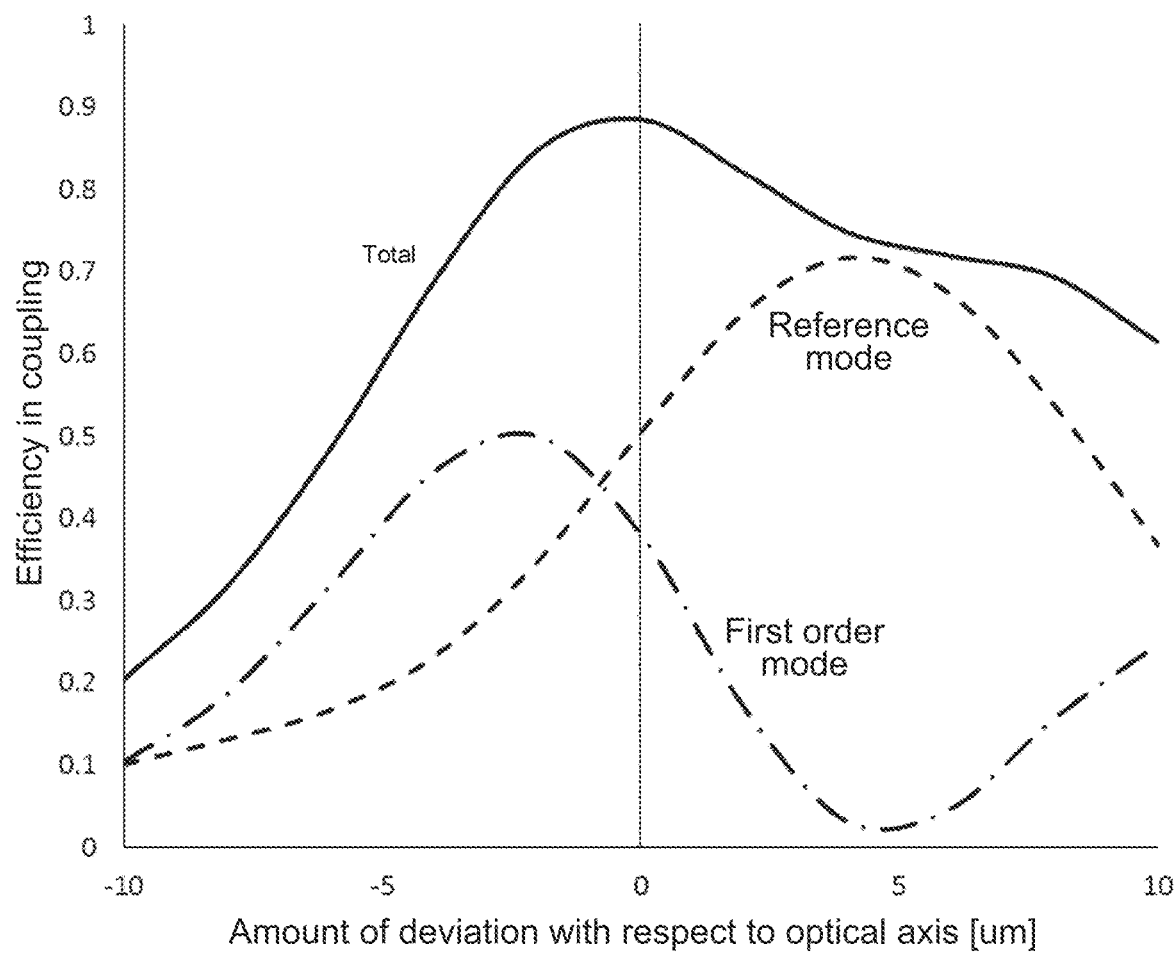
FIG. 20 is a graph in which components of a reference mode (zero order mode) and a first order mode are separately given.

FIG. 19 is a graph illustrating a result of simulating the efficiencies in coupling of optical power in the case of a double-lens system in which the lens 12R is provided, and in the case of a single-lens system in which the lens 12R is not provided. The horizontal axis represents an amount of a deviation with respect to an optical axis, and the vertical axis represents the efficiency in coupling. When there is a deviation with respect to an optical axis in a negative (−) direction, a greater efficiency in coupling is achieved in the case of the double-lens system, compared to the case of the single-lens system. Note that, in a graph of FIG. 20, components of a reference mode (zero order mode) and a first order mode in the case of the double-lens system are separately given, and the sum of them is represented by a curve Total.

Due to the following effects, the efficiency in coupling when there is a deviation with respect to an optical axis in a negative (−) direction is improved in the case of a double-lens system, compared to the case of a single-lens system, as described above. In other words, when light is caused to be headed in a direction of an optical axis again, the light will be headed for the center of the optical fiber 10R even if the optical fiber is shifted in a negative (−) direction. Thus, the double-lens system provides an effect of reducing a loss in reference mode itself and an effect of increasing a rate at which the reference mode is converted into a first order mode, compared to the case of the single-lens system. When the efficiency in coupling is 0.7, the amount of a deviation with respect to an optical axis is −1.5 µm in the single-lens system, whereas the amount of a deviation with respect to an optical axis is −4 µm in the double-lens system. This shows that it is possible to relax the accuracy by 2.7 times in the double-lens system, compared to the case of the single-lens system. Thus, the double-lens system makes it possible to more greatly relax the accuracy, and to reduce costs for components.

Figure 21:
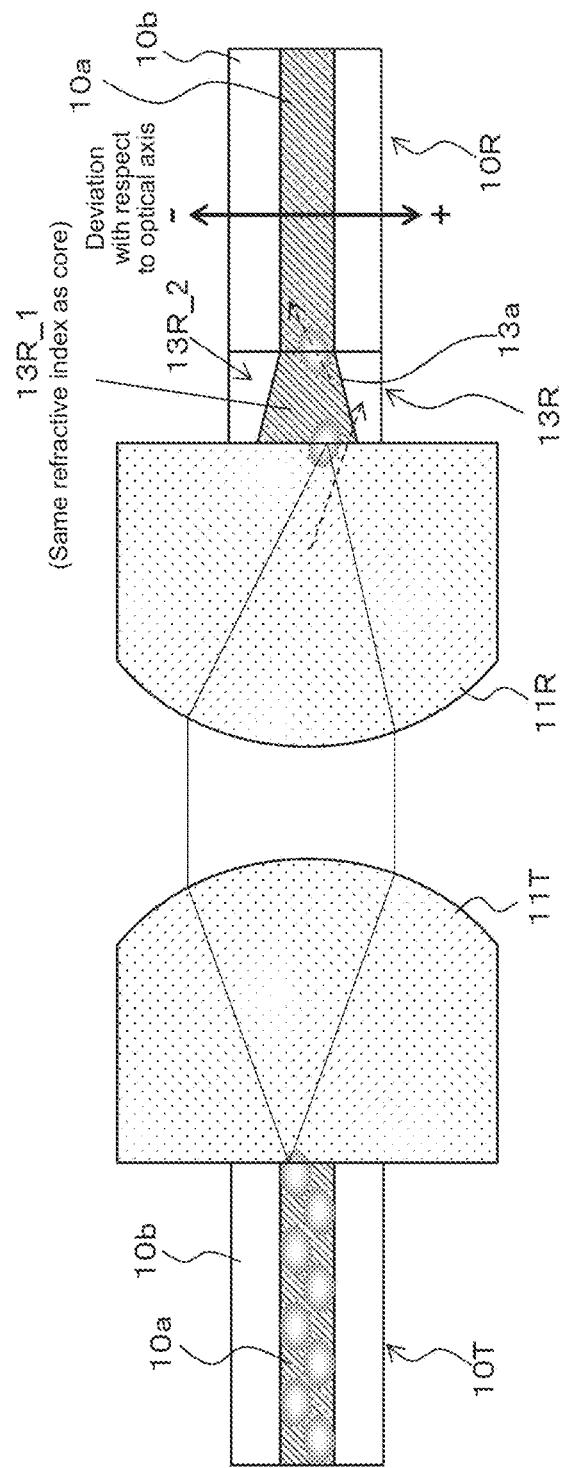
FIG. 21 illustrates an example in which a light path adjusting member is provided on the entrance side of the optical fiber.

FIG. 21 illustrates an example of providing a light path adjusting member 13R on the entrance side of the optical fiber 10R. The light path adjusting member 13R includes a center portion 13R_1 and an outer peripheral portion 13R_2, the center portion 13R_1 including a tapered surface 13a in which the diameter of the center portion 13R_1 is gradually decreased toward the core 10a of the optical fiber 10R, the outer peripheral portion 13R_2 being situated around the center portion 13R_1. The center portion 13R_1 includes a member similar to the member of the core 10a of the optical fiber 10R, and the outer peripheral portion 13R_2 includes a member similar to the member of the cladding 10b of the optical fiber 10R. Note that the configuration in which the center portion 13R_1 and the outer peripheral portion 13R_2 respectively include members similar to the member of the core 10a and the member of the cladding 10b, has been described above, but they are not limited to such a configuration. The center portion 13R_1 and the outer peripheral portion 13R_2 may respectively include another member that serves a function similar to the function of the member of the core 10a, and another member that serves a function similar to the function of the member of the cladding 10b.

Such a provision of the light path adjusting member 13R on the entrance side of the optical fiber 10R enables light to be reflected off the tapered surface 13a to be headed for the center corresponding to an optical axis again when the light deviates downward from the optical axis. Accordingly, the efficiency in coupling of optical power when there is a deviation with respect to an optical axis in a negative (−) direction can be improved, as in the case of the double-lens system described above.

Figure 22:
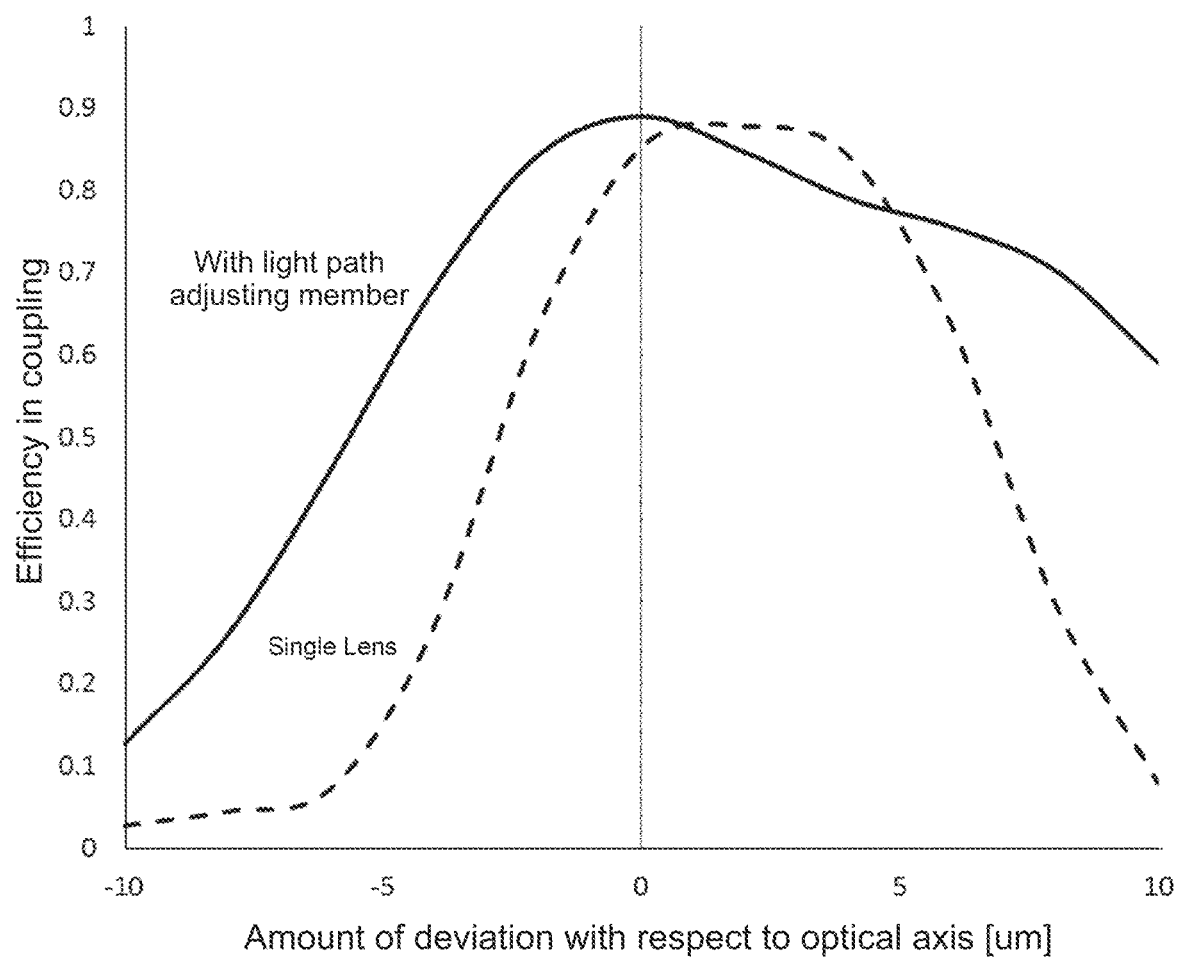
FIG. 22 is a graph illustrating a result of simulating the efficiencies in coupling of optical power.
Figure 23:
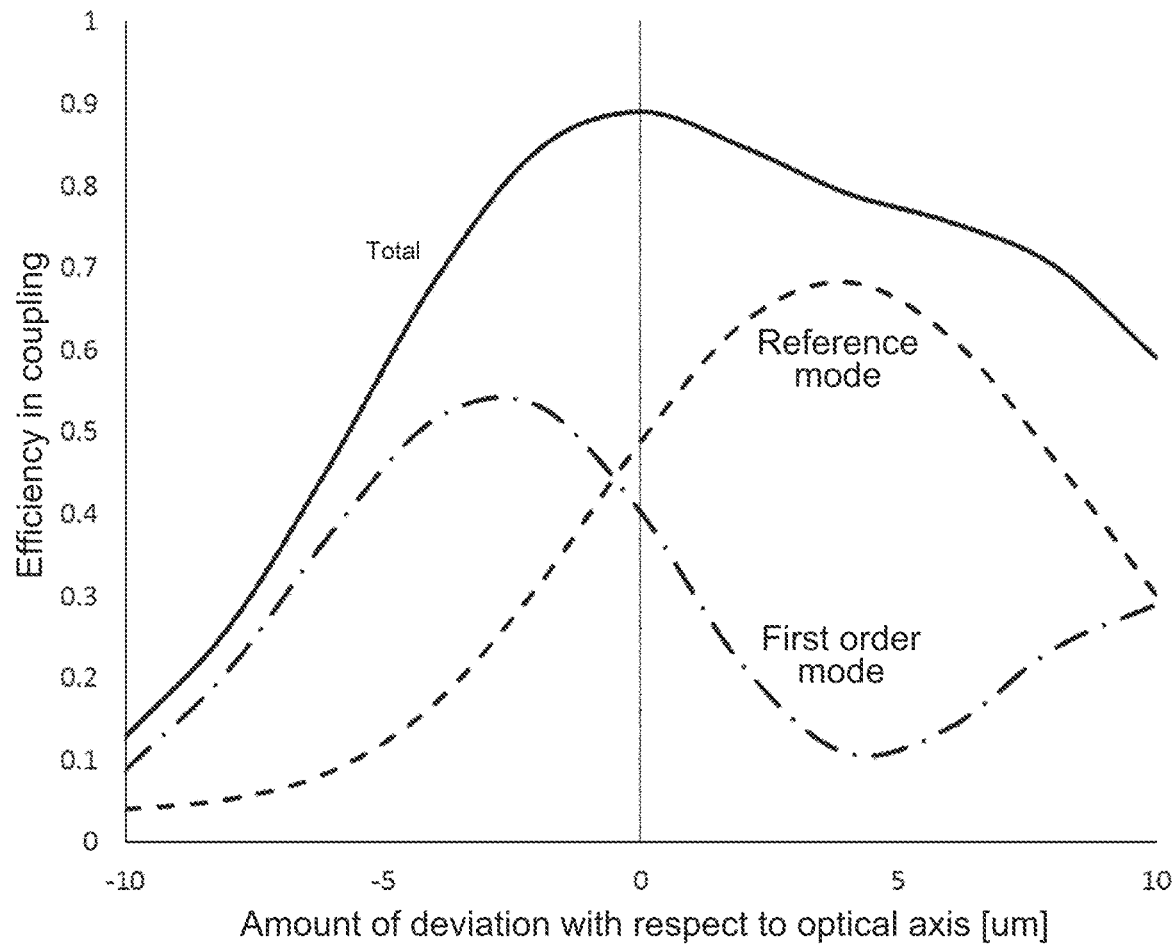
FIG. 23 is a graph in which components of a reference mode (zero order mode) and a first order mode are separately given.

FIG. 22 is a graph illustrating a result of simulating the efficiencies in coupling of optical power when the light path adjusting member 13R is provided and when a single-lens system in which the light path adjusting member 13R is not provided is adopted. The horizontal axis represents an amount of a deviation with respect to an optical axis, and the vertical axis represents the efficiency in coupling. When there is a deviation with respect to an optical axis in a negative (−) direction, a greater efficiency in coupling is achieved when the light path adjusting member 13R is provided, compared to when the single-lens system is adopted. Note that, in a graph of FIG. 23, components of a reference mode (zero order mode) and a first order mode when the light path adjusting member 13R is provided, are separately given, and the sum of them is represented by a curve Total.

Figure 24:
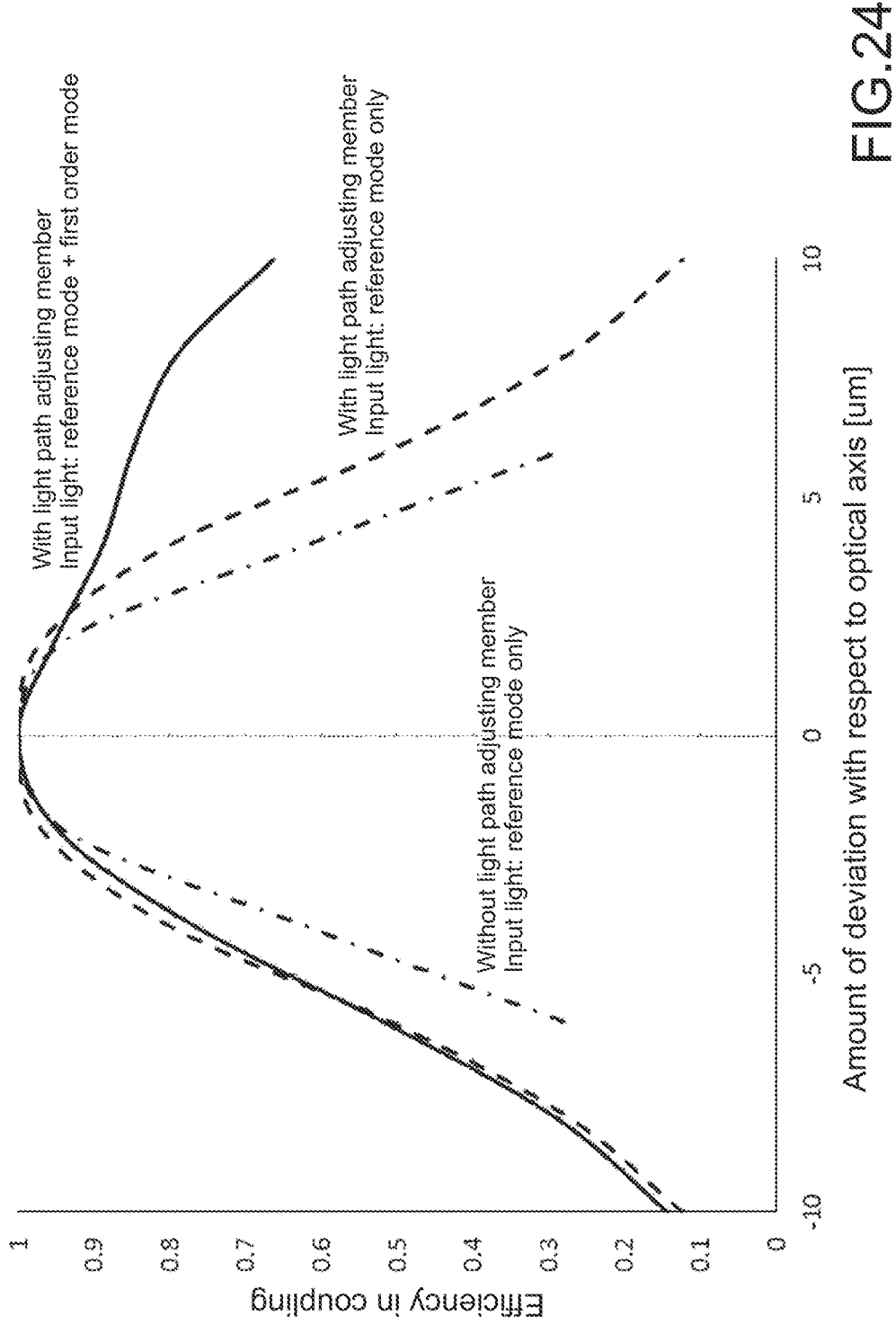
FIG. 24 is a graph illustrating a result of simulating the efficiencies in coupling of optical power.

FIG. 24 is a graph illustrating a result of simulating the efficiencies in coupling of optical power when input light only includes a component of a reference mode and the light path adjusting member 13R is not provided (a dot-dash line), when the input light only includes the component of the reference mode and the light path adjusting member 13R is provided (a dashed line), and when the input light includes the component of the reference mode and a component of a first order mode and the light path adjusting member 13R is provided (a solid line). The horizontal axis represents an amount of a deviation with respect to an optical axis, and the vertical axis represents the efficiency in coupling. Here, the efficiency in coupling in a portion with a highest intensity is normalized by being set to 1, in order to bring all of the references into line.

Under the condition that the input light only includes the component of the reference mode, the case in which the light path adjusting member 13R is provided and the case in which the light path adjusting member 13R is not provided are compared. A greater efficiency in coupling is achieved when the light path adjusting member 13R is provided, compared to when the light path adjusting member 13R is not provided. The reason is that the tapered surface 13a causes light to be headed for the core 10a again when the light deviates from a direction of the core 10a.

Under the condition that the light path adjusting member 13R is provided, the case in which the input light only includes the component of the reference mode and the case in which the input light includes the components of the reference mode and the first order mode are compared. In the case in which there is a deviation with respect to an optical axis in a positive (+) direction, a greater efficiency in coupling is achieved when the input light includes the components of the reference mode and the first order mode, compared to when the input light only includes the component of the reference mode. The reason is that a portion of light that has a high degree of intensity easily enters the side of the core 10a of the optical fiber 10R when there is a deviation in the positive (+) direction. Further, when there is a deviation with respect to an optical axis in a negative (−) direction, light that travels in a direction of deviating from the direction of the core 10a is also captured to the same extent as the input light only including the component of the reference mode, due to the tapered surface 13a. The reason is that an opening of the tapered surface 13a on the side of the entrance end of the optical fiber 10R is larger in size than the core 10a.

Figure 25:
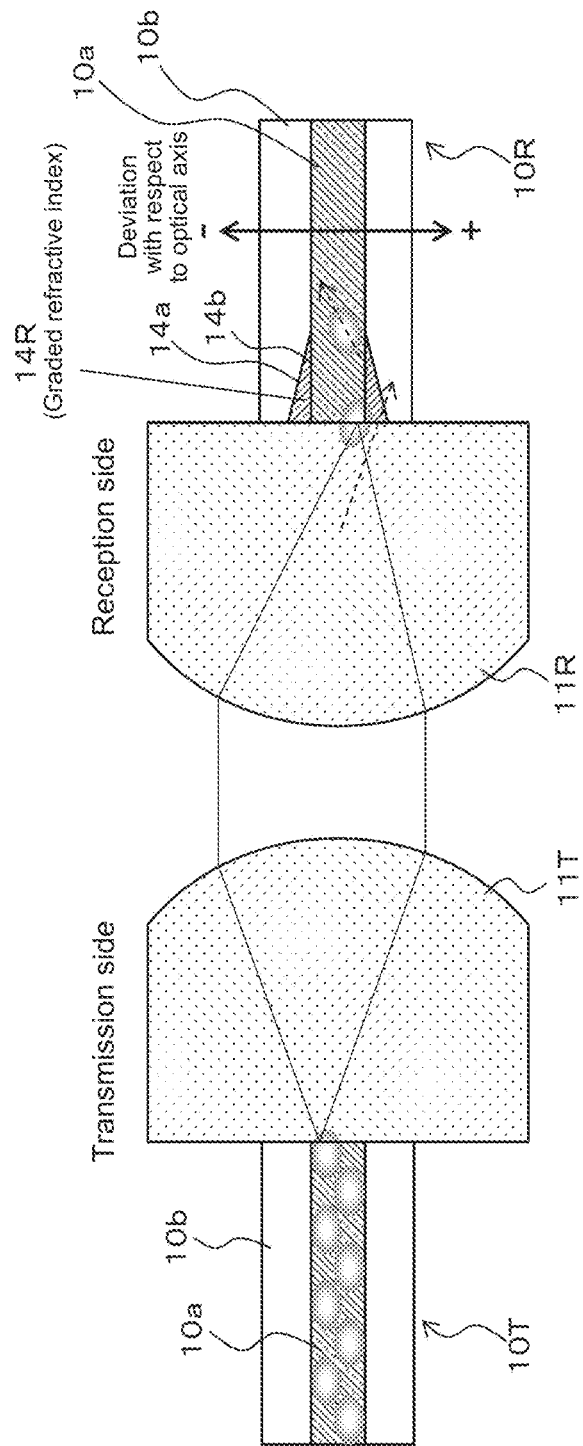
FIG. 25 illustrates an example in which a light path adjusting member is provided between a core and cladding at an entrance end of the optical fiber.

FIG. 25 illustrates an example of providing a light path adjusting member 14R between the core 10a and the cladding 10b at the entrance end of the optical fiber 10R. The light path adjusting member 14R includes a tapered surface 14a that is a surface in contact with the cladding 10b, and a cylindrical surface 14b that is a surface in contact with the core 10a, the tapered surface 14a being a surface in which the diameter of the light path adjusting member 14R is gradually decreased toward the core 10a. In the light path adjusting member 14R, the cylindrical surface 14b has the same refractive index as the core 10a, and the tapered surface 14a has the same refractive index as the cladding 10b. The light path adjusting member 14R has a so-called graded refractive index in which the refractive index is gradually changed from the cylindrical surface 14b to the tapered surface 14a.

Such a provision of the light path adjusting member 14R between the core 10a and the cladding 10b at the entrance end of the optical fiber 10R enables light to be reflected off the light path adjusting member 14R including the tapered surface 14a to be headed for the center corresponding to an optical axis again when the light deviates downward from the optical axis. Accordingly, the efficiency in coupling of optical power when there is a deviation with respect to an optical axis in a negative (−) direction can be improved, as in the case of the double-lens system described above.

Figure 26:
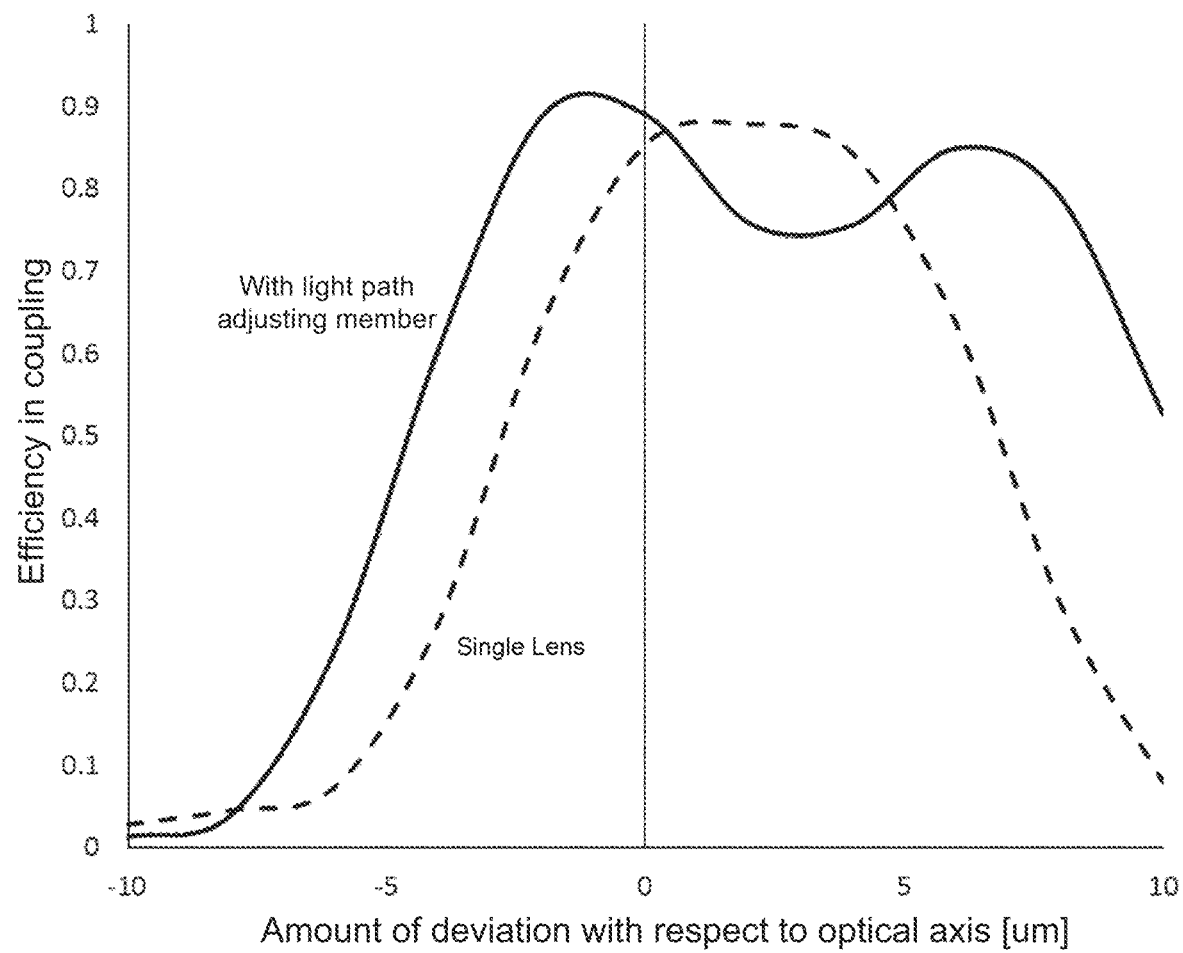
FIG. 26 is a graph illustrating a result of simulating the efficiencies in coupling of optical power.
Figure 27:
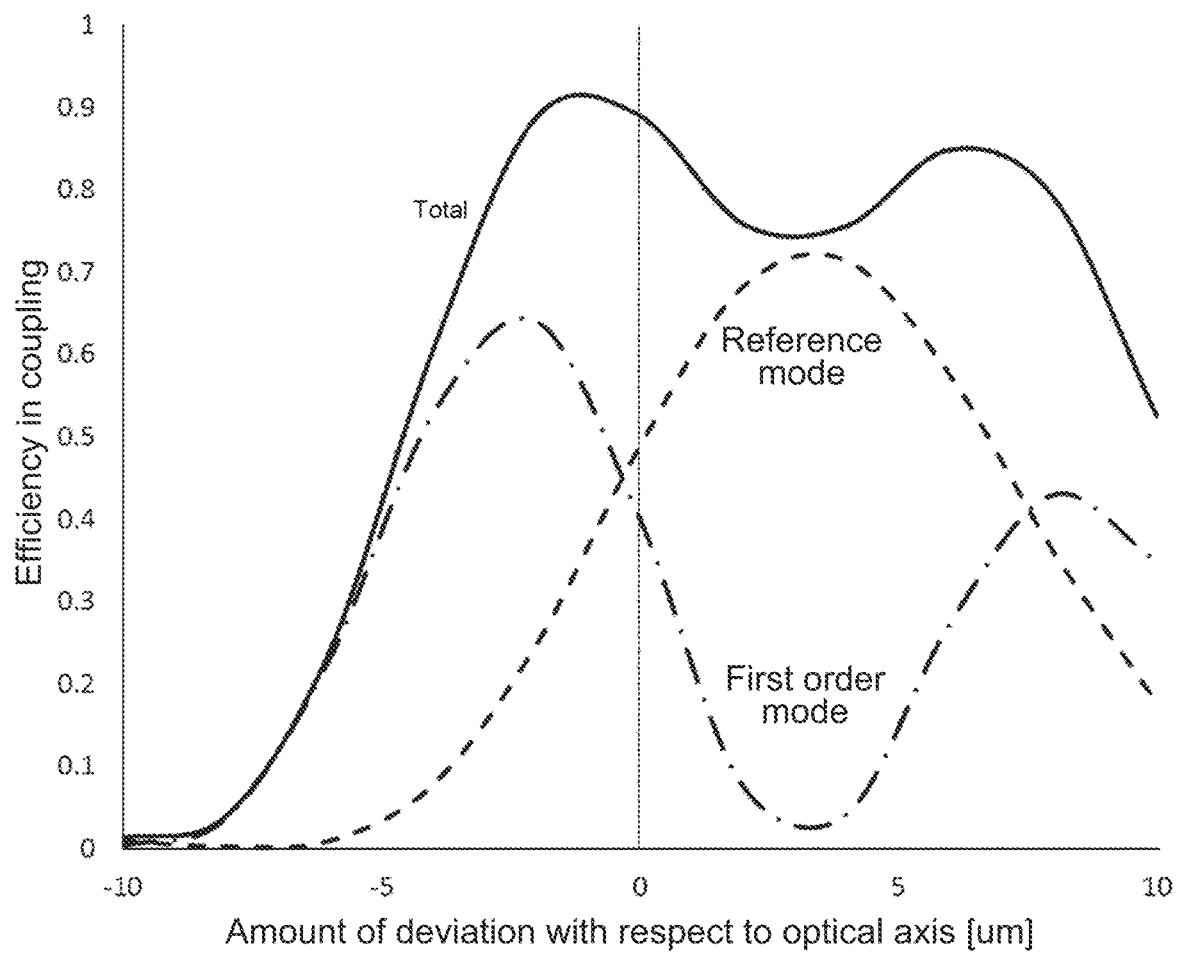
FIG. 27 is a graph in which components of a reference mode (zero order mode) and a first order mode are separately given.

FIG. 26 is a graph illustrating a result of simulating the efficiencies in coupling of optical power when the light path adjusting member 14R is provided and when a single-lens system in which the light path adjusting member 14R is not provided is adopted. The horizontal axis represents an amount of a deviation with respect to an optical axis, and the vertical axis represents the efficiency in coupling. When there is a deviation with respect to an optical axis in a negative (−) direction, a greater efficiency in coupling is achieved when the light path adjusting member 14R is provided, compared to when the single-lens system is adopted. Note that, in a graph of FIG. 27, components of a reference mode (zero order mode) and a first order mode when the light path adjusting member 14R is provided, are separately given, and the sum of them is represented by a curve Total.

Note that the light path adjusting member 13R provided at the entrance end of the optical fiber 10R of FIG. 21 may have a configuration similar to the configuration of the entrance end of the optical fiber 10R of FIG. 25, or the entrance end of the optical fiber 10R of FIG. 25 may have a configuration similar to the configuration of the light path adjusting member 13R provided at the entrance end of the optical fiber 10R of FIG. 21, although a detailed description thereof is omitted.

Figure 28:
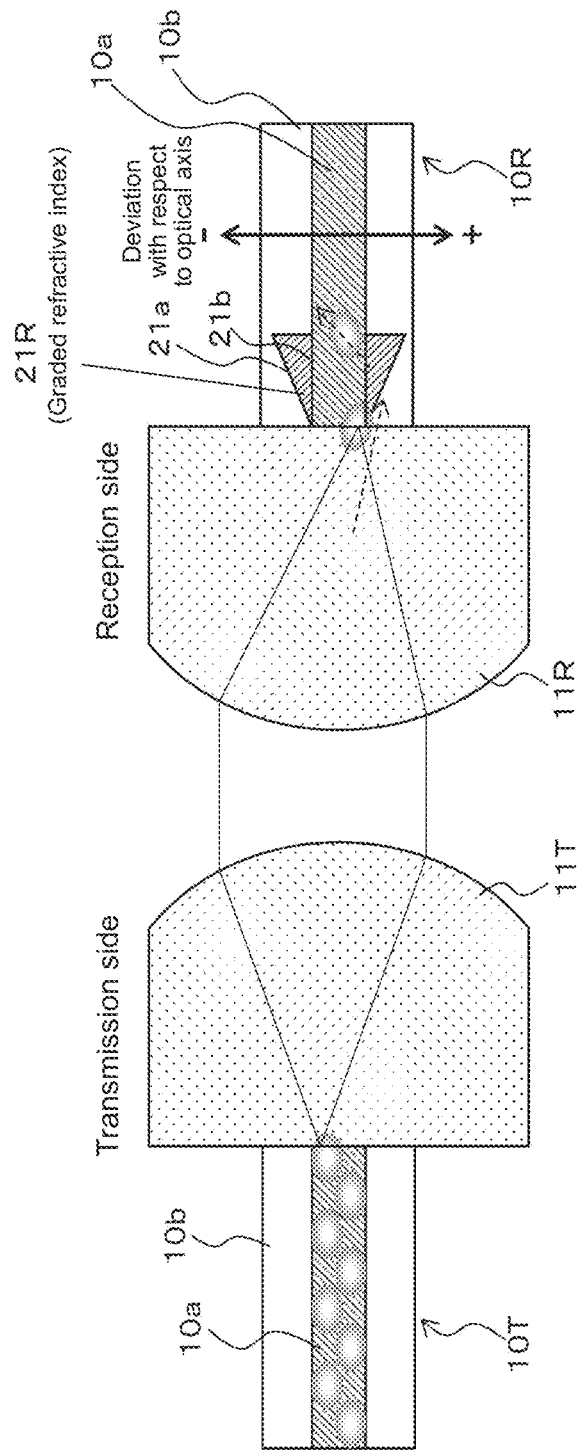
FIG. 28 illustrates an example in which a light path adjusting member is provided between the core and the cladding at the entrance end of the optical fiber.

FIG. 28 illustrates an example of providing a light path adjusting member 21R between the core 10a and the cladding 10b at the entrance end of the optical fiber 10R. The light path adjusting member 21R includes a tapered surface 21a that is a surface in contact with the cladding 10b, and a cylindrical surface 21b that is a surface in contact with the core 10a, the tapered surface 21a being a surface in which the diameter of the light path adjusting member 21R is gradually increased from the core 10a. In the light path adjusting member 21R, the cylindrical surface 21b has the same refractive index as the core 10a, and the tapered surface 21a has the same refractive index as the cladding 10b. The light path adjusting member 21R has a so-called graded refractive index in which the refractive index is gradually changed from the cylindrical surface 21b to the tapered surface 21a.

Such a provision of the light path adjusting member 21R between the core 10a and the cladding 10b at the entrance end of the optical fiber 10R enables light to enter a tapered portion via the cladding 10b and thus to be coupled to the core 10a when the light deviates downward or upward from the optical axis. Accordingly, the efficiency in coupling of optical power when there is a deviation with respect to an optical axis in a negative (−) direction can be improved, as in the case of the double-lens system described above.

Figure 29:
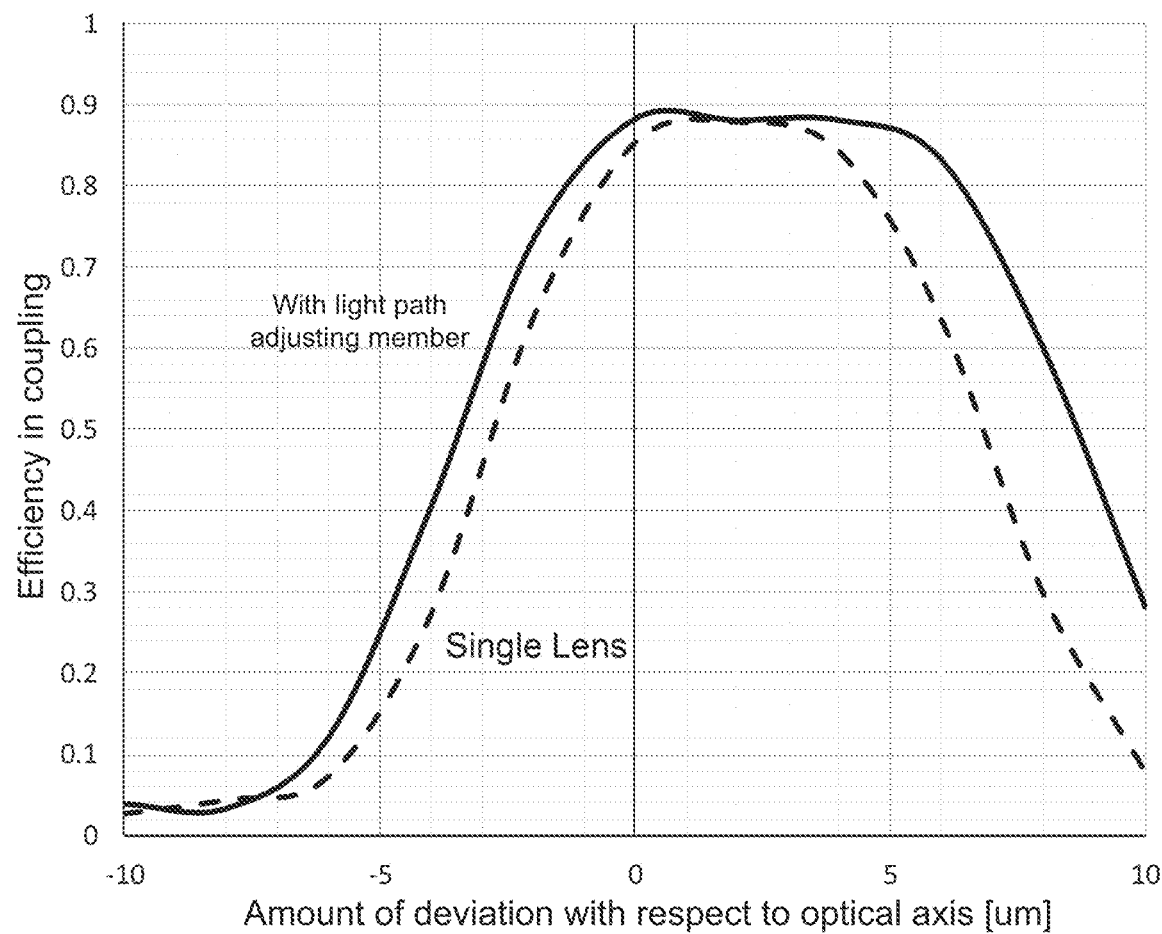
FIG. 29 is a graph illustrating a result of simulating the efficiencies in coupling of optical power.
Figure 30:
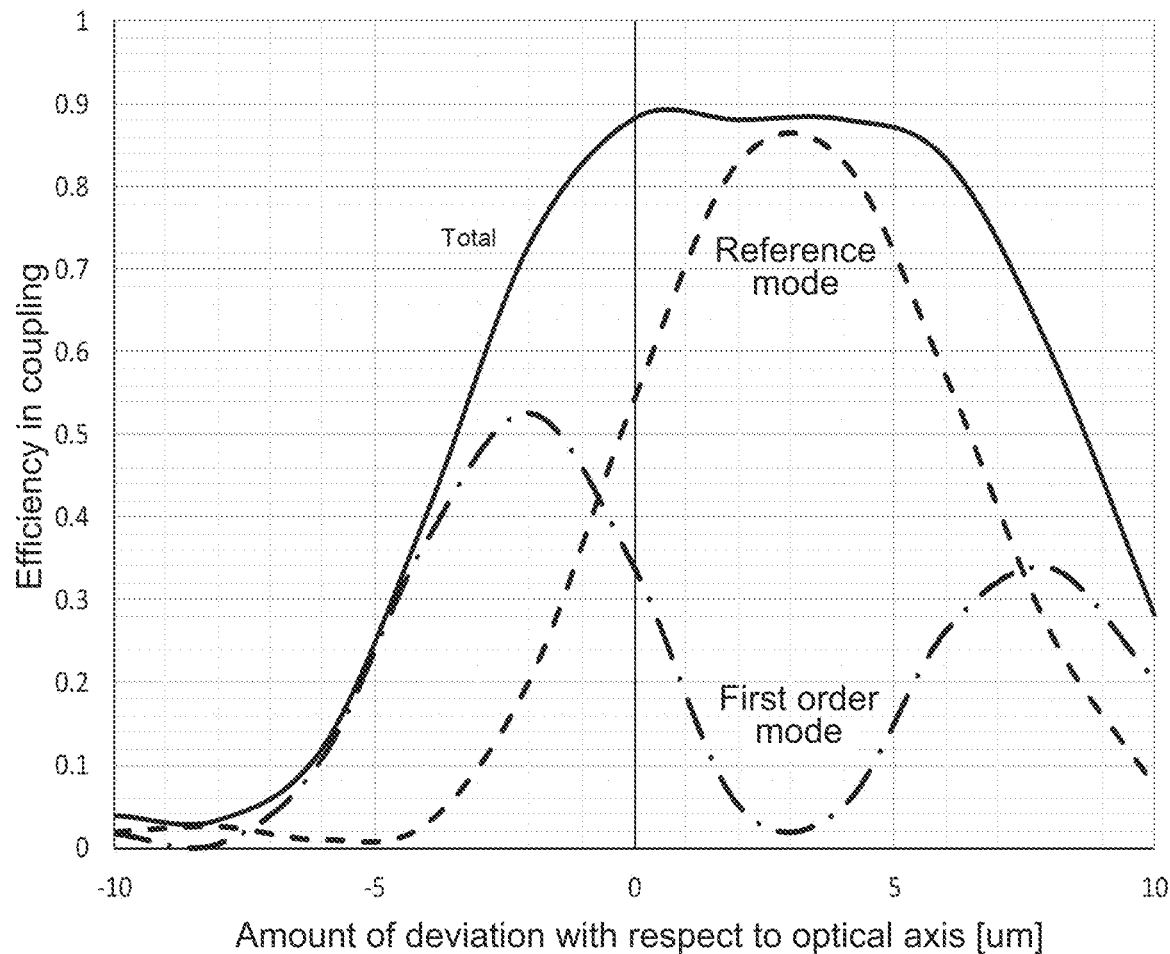
FIG. 30 is a graph in which components of a reference mode (zero order mode) and a first order mode are separately given.

FIG. 29 is a graph illustrating a result of simulating the efficiencies in coupling of optical power when the light path adjusting member 21R is provided and when a single-lens system in which the light path adjusting member 21R is not provided is adopted. The horizontal axis represents an amount of a deviation with respect to an optical axis, and the vertical axis represents the efficiency in coupling. When, for example, there is a deviation with respect to an optical axis in a negative (−) direction, a greater efficiency in coupling is achieved when the light path adjusting member 21R is provided, compared to when the single-lens system is adopted. Note that, in a graph of FIG. 30, components of a reference mode (zero order mode) and a first order mode when the light path adjusting member 21R is provided, are separately given, and the sum of them is represented by a curve Total.

Note that the light path adjusting member 13R provided at the entrance end of the optical fiber 10R of FIG. 21 may have a configuration similar to the configuration of the entrance end of the optical fiber 10R of FIG. 28, although a detailed description thereof is omitted.

Figure 31:
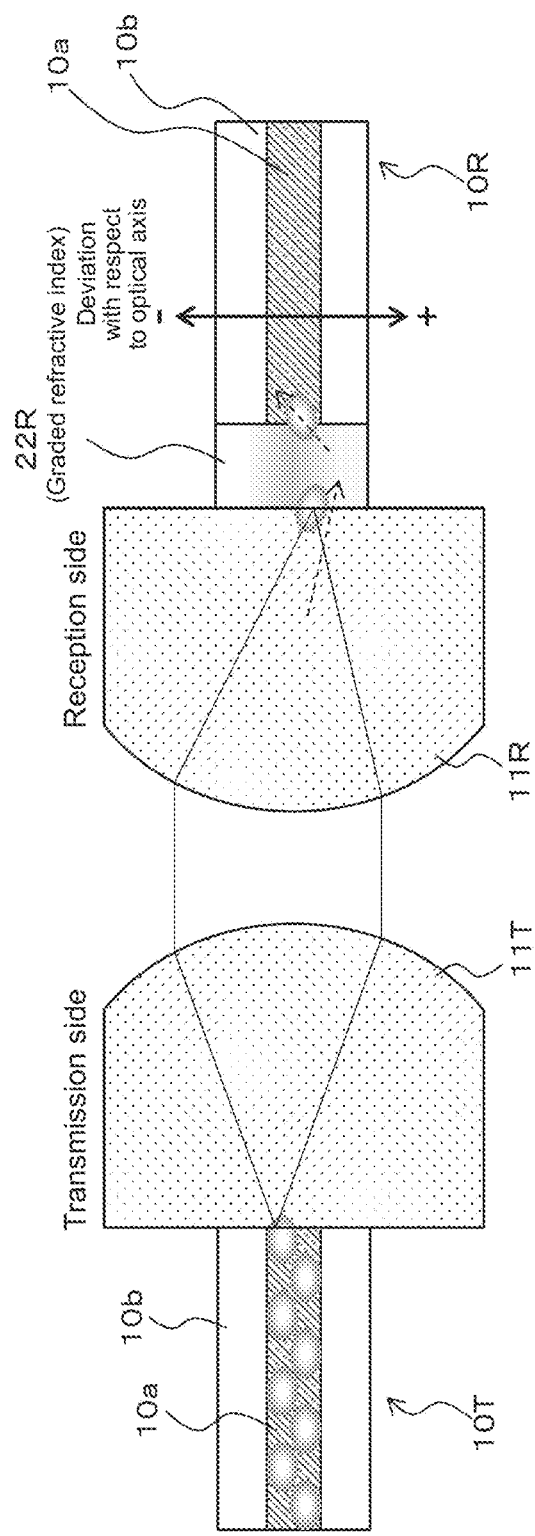
FIG. 31 illustrates an example in which a light path adjusting member is provided on the entrance side of the optical fiber.

FIG. 31 illustrates an example of providing a light path adjusting member 22R on the entrance side of the optical fiber 10R. The light path adjusting member 22R is a member that has a refractive-index distribution. The light path adjusting member 22R has a refractive index having a gradation structure in which the light path adjusting member 22R has, on the optical axis, a refractive index equal to the refractive index of the core 10a of the optical fiber 10R, and the light path adjusting member 22R has a refractive index lower at a position, in the light path adjusting member 22R, that is situated vertically further away from the optical axis.

Figure 32:
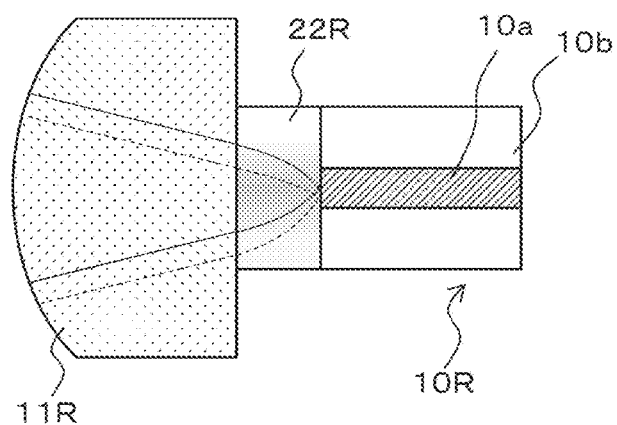
FIG. 32 is a diagram for describing the reason that light can be headed for the center again when there is a deviation with respect to an optical axis.

When the light path adjusting member 22R is provided on the entrance side of the optical fiber 10R, as described above, light entering the light path adjusting member 22R travels while being bent in a direction of an optical axis due to an effect provided by the gradation. Further, such a provision of the light path adjusting member 22R enables light to be headed for the center again when the light deviates from the optical axis. The following is the reason for that. When the light path deviates downward from the optical axis, as indicated by a dashed line of FIG. 32, light near the optical axis is less bent due to a small difference in refractive index, and light that deviates further from the optical axis is greatly bent due to a large difference in refractive index. Thus, light is concentrated on a portion around the center of the core 10a. Accordingly, the efficiency in coupling of optical power when there is a deviation with respect to an optical axis in a negative (−) direction can be improved, as in the case of the double-lens system described above.

Figure 33:
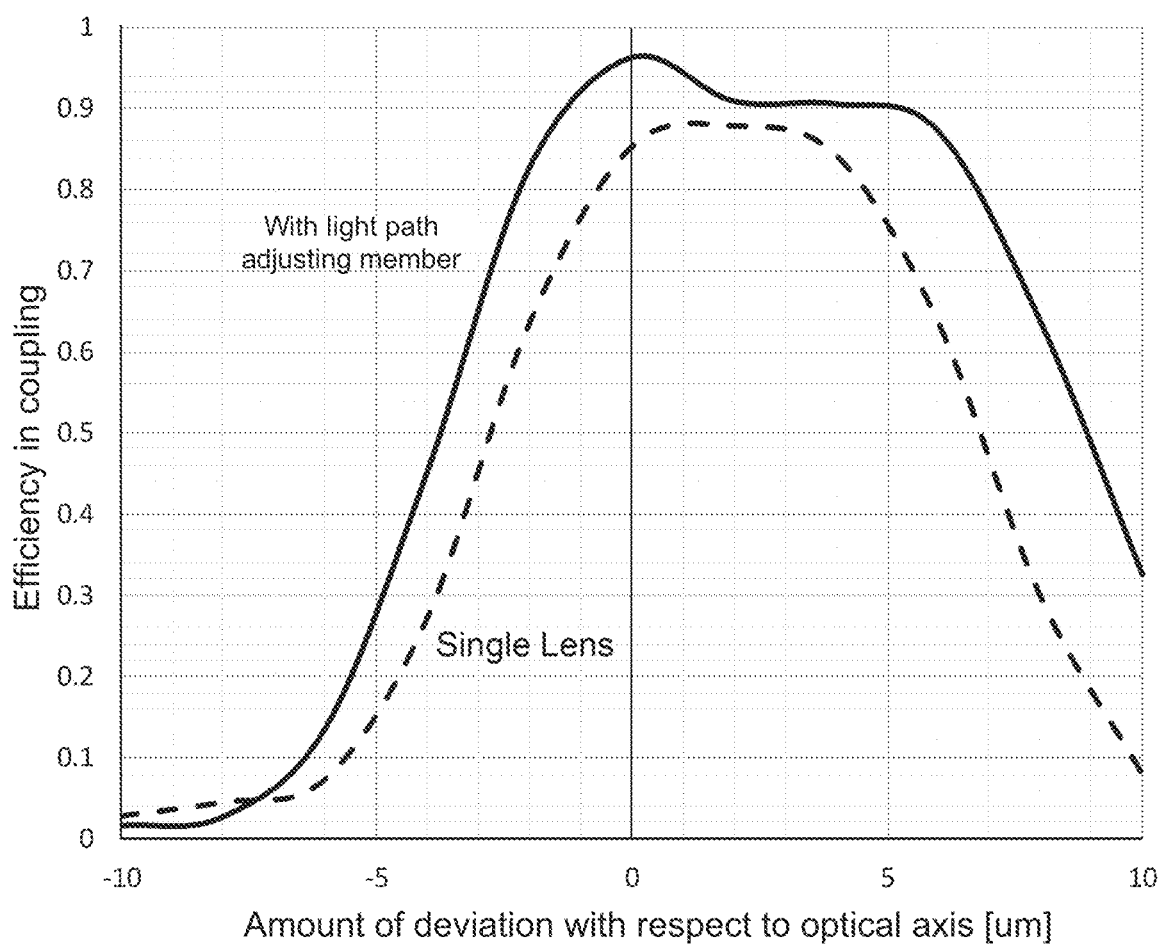
FIG. 33 is a graph illustrating a result of simulating the efficiencies in coupling of optical power.
Figure 34:
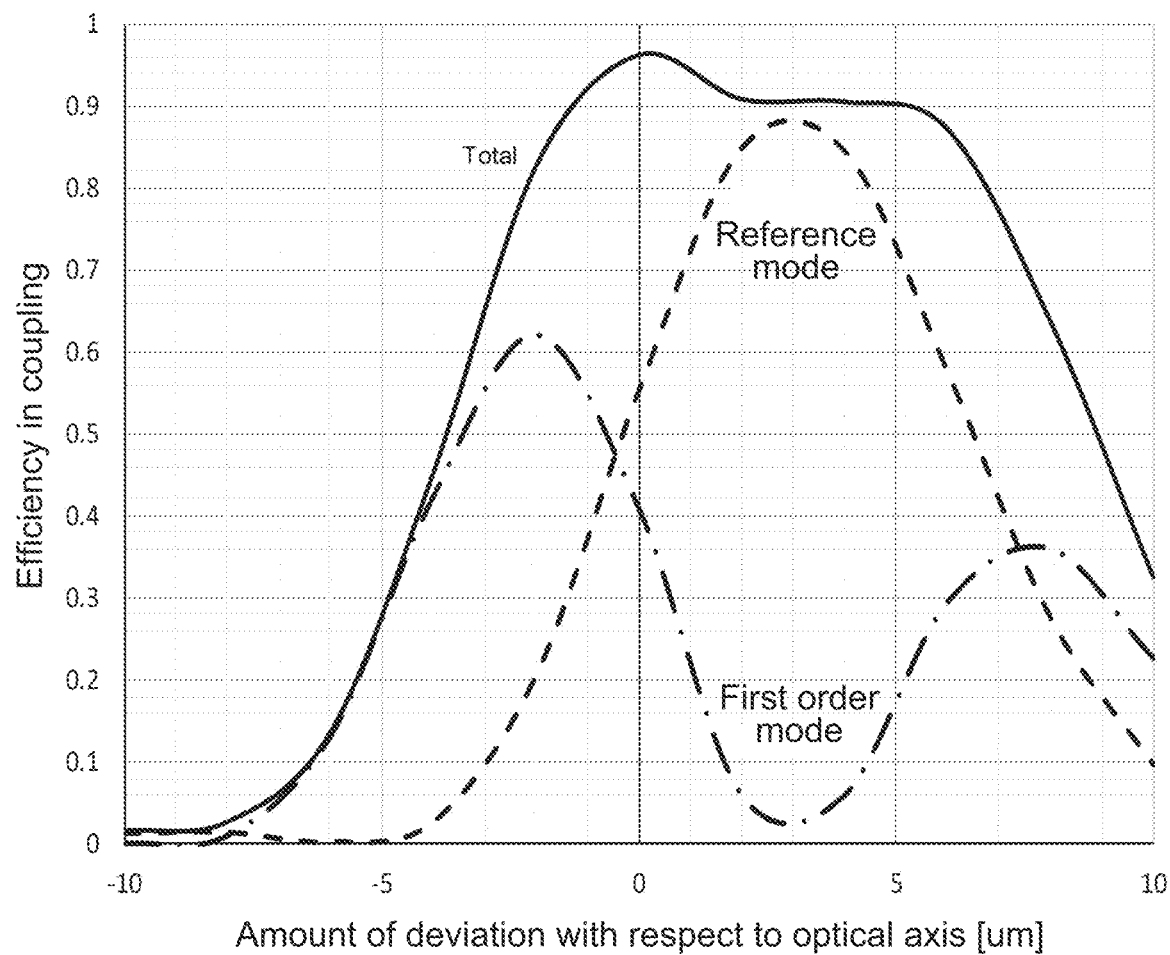
FIG. 34 is a graph in which components of a reference mode (zero order mode) and a first order mode are separately given.

FIG. 33 is a graph illustrating a result of simulating the efficiencies in coupling of optical power when the light path adjusting member 22R is provided and when a single-lens system in which the light path adjusting member 22R is not provided is adopted. The horizontal axis represents an amount of a deviation with respect to an optical axis, and the vertical axis represents the efficiency in coupling. When, for example, there is a deviation with respect to an optical axis in a negative (−) direction, a greater efficiency in coupling is achieved when the light path adjusting member 22R is provided, compared to when the single-lens system is adopted. Note that, in a graph of FIG. 34, components of a reference mode (zero order mode) and a first order mode when the light path adjusting member 22R is provided, are separately given, and the sum of them is represented by a curve Total.

Figure 35:
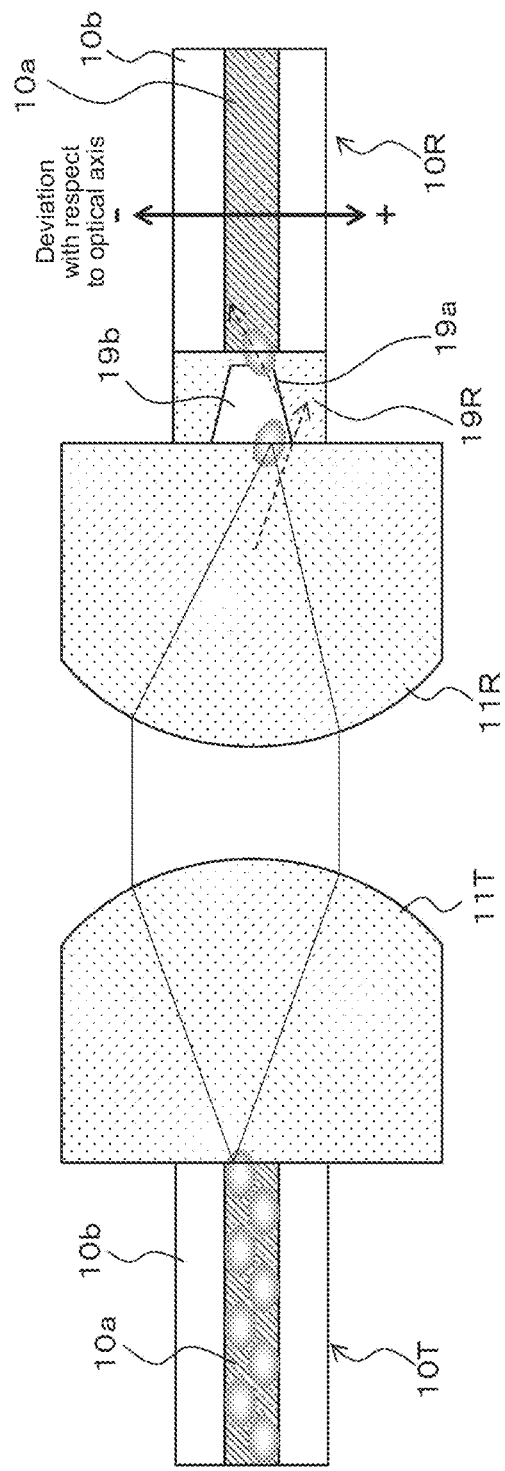
FIG. 35 illustrates an example in which a light path adjusting member is provided on the entrance side of the optical fiber.

FIG. 35 illustrates an example of providing a light path adjusting member 19R on the entrance side of the optical fiber 10R. The light path adjusting member 19R is a member that includes a funnel-shaped space 19b including a tapered surface 19a in which the diameter of the funnel-shaped space 19b is gradually decreased toward the core 10a of the optical fiber 10R. A mirror is arranged on the tapered surface 19a such that input light is totally reflected. The mirror is not limited to being separately generated and being fixed on the tapered surface 19a, and the mirror may be formed on the tapered surface 19a by, for example, vapor deposition.

Such a provision of the light path adjusting member 19R on the entrance side of the optical fiber 10R enables light to be reflected off the tapered surface 19a to be headed for the center corresponding to an optical axis again when the light deviates downward from the optical axis. Accordingly, the efficiency in coupling of optical power when there is a deviation with respect to an optical axis in a negative (−) direction can be improved, as in the case of the double-lens system described above.

Note that the funnel-shaped space 19b includes a bottom portion in the example of FIG. 35. However, the funnel-shaped space 19b may be in the form of a through-hole without the bottom portion.

[Transmission-and-Reception System]

Figure 36:
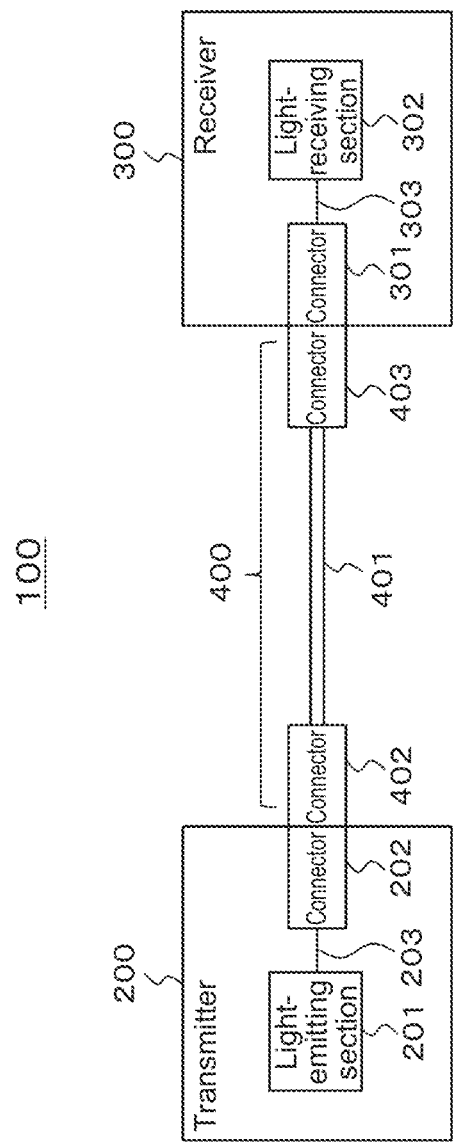
FIG. 36 is a block diagram illustrating an example of a configuration of a transmission-and-reception system according to embodiments.

FIG. 36 illustrates a transmission-and-reception system 100 according to the embodiments. The transmission-and-reception system 100 includes a transmitter 200, a receiver 300, and a cable 400. Examples of the transmitter 200 include AV sources such as a personal computer, a game machine, a disc player, a set-top box, a digital camera, and a cellular phone. Examples of the receiver 300 include a television receiver and a projector. The transmitter 200 and the receiver 300 are connected to each other through the cable 400.

The transmitter 200 includes a light-emitting section 201, a connector 202 that serves as a receptacle, and an optical fiber 203 that propagates, to the connector 202, light emitted by the light-emitting section 201. The light-emitting section 201 includes a laser element such as a vertical-cavity surface-emitting laser (VCSEL), or a light-emitting element such as a light-emitting diode (LED). The light-emitting section 201 converts, into an optical signal, an electric signal (a transmission signal) generated by a transmission circuit (not illustrated). The optical signal emitted by the light-emitting section 201 is propagated to the connector 202 through the optical fiber 203.

Further, the receiver 300 includes a connector 301 that serves as a receptacle, a light-receiving section 302, and an optical fiber 303 that propagates, to the light-receiving section 302, light obtained by the connector 301. The light-receiving section 302 includes a light-receiving element such as a photodiode. The light-receiving section 302 converts, into an electric signal (a reception signal), an optical signal transmitted from the connector 301, and supplies the electric signal to a reception circuit (not illustrated).

The cable 400 includes an optical fiber 401, and connectors 402 and 403 that are respectively situated at one end of the optical fiber 401 and at the other end of the optical fiber 401, the connectors 402 and 403 each serving as a plug. The connector 402 at one end of the optical fiber 401 is connected to the connector 202 of the transmitter 200, and the connector 403 at the other end of the optical fiber 401 is connected to the connector 301 of the receiver 300.

In the embodiments, the optical fiber 203 of the transmitter 200, the optical fiber 303 of the receiver 300, and the optical fiber 401 of the cable 400 perform propagation only in a reference mode at a first wavelength. Further, these optical fibers are configured such that the wavelength dispersion is zero at the first wavelength. For example, settings are performed such that the first wavelength is 1310 nm, and such that the core diameter d is 8 μm and the numerical aperture NA is 0.1, which respectively represent typical parameters for a 1310 nm optical fiber. This results in the normalized frequency V=1.92. Thus, these optical fibers serve as a single-mode fiber at a wavelength of 1310 nm (refer to FIGS. 3A and 3B).

Further, in the embodiments, communication is performed using light that has a second wavelength and includes a component of at least the first order mode in addition to a component of the reference mode. Here, the second wavelength is a wavelength that enables the respective optical fibers to perform propagation in at least the first order mode in addition to the reference mode. Specifically, the second wavelength is 850 nm. When light of 850 nm is used, the normalized frequency V=2.96 in these optical fibers. Thus, the optical fibers can perform propagation in the first order mode in addition to the reference mode, and they serve as a double-mode fiber (refer to FIGS. 6A and 6B).

In the transmitter 200, light of 850 nm (including the components of the reference mode and the first order mode) that is emitted by the light-emitting section 201 is propagated to the connector 202 through the optical fiber 203, which is a 1310 nm single-mode fiber.

Further, in a portion of connection between the connector 202 of the transmitter 200 and the connector 402 of the cable 400, a light path adjuster that adjusts a light path such that input light is guided to a core of the optical fiber 401 is arranged in a portion of the connector 402. Examples of the light path adjuster include the lens 12R illustrated in FIG. 18, the light path adjusting member 13R illustrated in FIG. 21, the light path adjusting member 14R illustrated in FIG. 25, the light path adjusting member 21R illustrated in FIG. 28, the light path adjusting member 22R illustrated in FIG. 31, and the light path adjusting member 19R illustrated in FIG. 35. Through the light path adjuster, the light of 850 nm exiting the connector 202 (and including components of a reference mode and a first order mode) is coupled to the core of the optical fiber 401, which is a 1310 nm single-mode fiber, and is propagated to the receiver 300.

In this case, input light that is not headed for the core of the optical fiber 401 of the connector 402 from the connector 202 is guided to the core of the optical fiber 401 due to the light path adjuster adjusting a path of the light. Here, the angle of incidence with which transmission can be performed by the optical fiber 401, is made larger by using light of a wavelength of 850 nm, compared to the use of light of a wavelength of 1310 nm. This results in a reduction in a loss of coupling of optical power. Further, in this case, when the light entering the optical fiber 401 deviates with respect to an optical axis, propagation is performed in the first order mode in addition to the reference mode, the first order mode being generated due to the deviation with respect to the optical axis. This results in a reduction in a loss of coupling of optical power. This makes it possible to relax the accuracy with respect to a positional deviation, and thus to reduce costs.

The same applies to a portion of connection between the connector 403 of the cable 400 and the connector 301 of the receiver 300. In this case, a light path adjuster that adjusts a light path such that input light is guided to a core of the optical fiber 303 is arranged in a portion of the connector 301. Through the light path adjuster, the light of 850 nm exiting the connector 403 (and including components of a reference mode and a first order mode) is coupled to the core of the optical fiber 303, which is a 1310 nm single-mode fiber, and is propagated to the light-receiving section 302.

Figure 37:
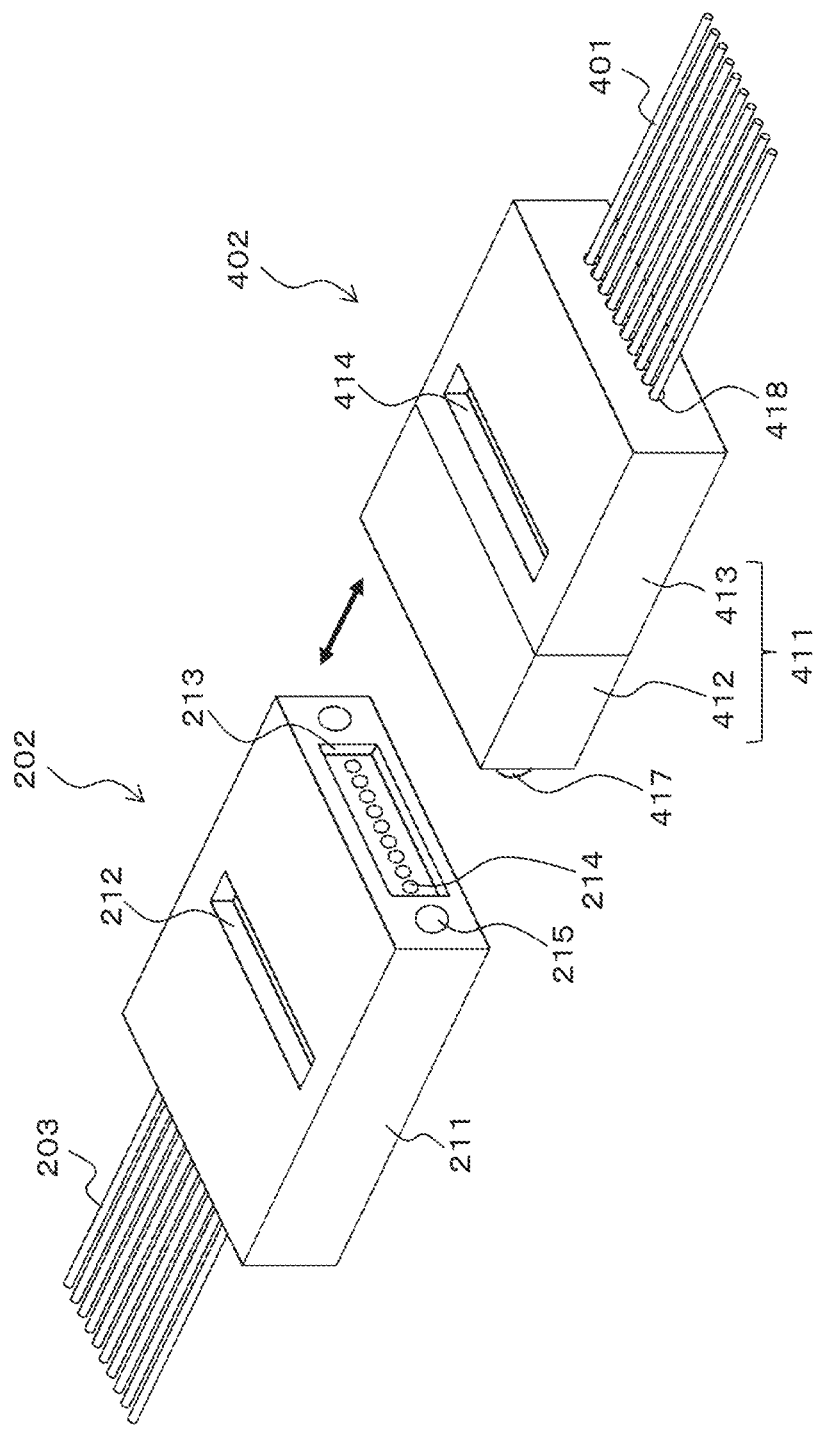
FIG. 37 is a perspective view illustrating an example of a configuration of a connector of a transmitter and a connector of a cable.
Figure 38:
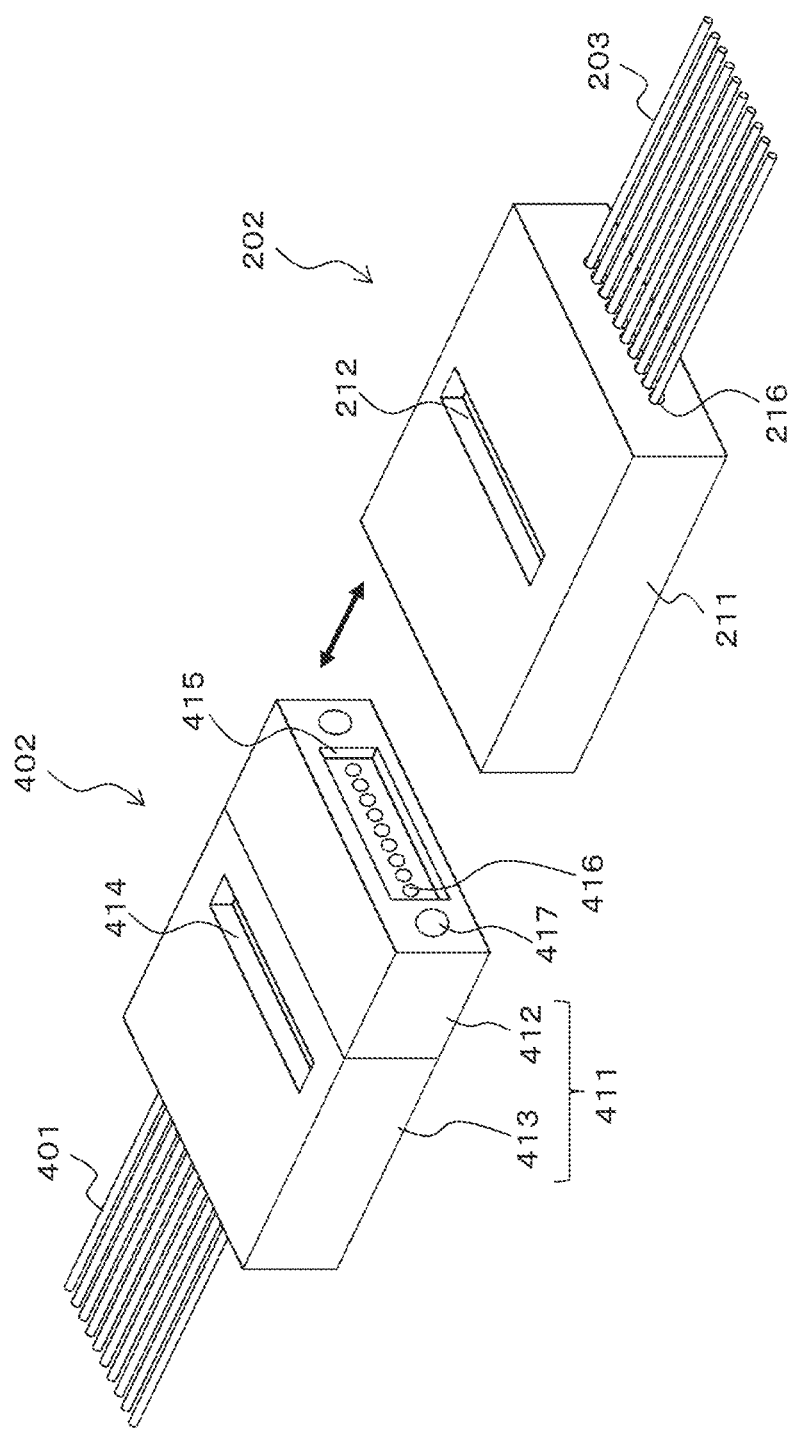
FIG. 38 is a perspective view illustrating the example of the configuration of the connector of the transmitter and the connector of the cable.

FIG. 37 is a perspective view illustrating an example of a configuration of the connector 202 of the transmitter 200 and the connector 402 of the cable 400. FIG. 38 is also a perspective view illustrating the example of the configuration of the connector 202 of the transmitter 200 and the connector 402 of the cable 400, as viewed from a direction opposite to a direction from which the configuration is viewed in FIG. 37. The illustrated example meets a parallel transmission of optical signals of a plurality of channels. However, it is also possible to provide a configuration that meets a transmission of an optical signal of a channel, although a detailed description thereof is omitted. Note that an example in which the light path adjuster included in the connector 402 is a lens (refer to FIG. 18) is described below.

The connector 202 has a connector body (a ferrule) 211 of which an appearance has a shape of a substantially rectangular parallelepiped. A plurality of horizontally arranged optical fibers 203 respectively corresponding to channels is connected on the side of a rear face of the connector body 211. Ends of the respective optical fibers 203 are respectively inserted into optical fiber inserting holes 216 to fix the optical fibers 203.

Further, an adhesive injection hole 212 that includes a rectangular opening is formed on the side of an upper face of the connector body 211. An adhesive used to fix the optical fiber 203 to the connector body 211 is injected through the adhesive injection hole 212.

Furthermore, a concave light exit portion (a light transmission space) 213 that includes a rectangular opening is formed on the side of a front face of the connector body 211, and a plurality of horizontally arranged lenses (convex lenses) 214 respectively corresponding to channels is formed in a bottom portion of the light exit portion 213. This prevents the surface of the lens 214 from unintendedly coming into contact with, for example, a counterpart connector and from being damaged.

Moreover, a convex or concave position regulator 215 used to align the connector 202 with the connector 402 is integrally formed on the side of the front face of the connector body 211, where the position regulator 215 is concave in the illustrated example. This makes it possible to easily perform an optical-axis alignment when the connector 202 is connected to the connector 402.

The optical connector 402 includes a connector body 411 of which an appearance has a shape of a substantially rectangular parallelepiped. The connector body 411 includes a first optical section 412 and a second optical section (ferrule) 413 that are connected to each other. As described above, the connector body 411 includes the first optical section 412 and the second optical section 413, and this makes it possible to easily perform, for example, a production of a second lens (a convex lens) that is a light path adjuster, although the second lens is not illustrated in FIGS. 37 and 38.

A concave light entrance portion (a light transmission space) 415 that includes a rectangular opening is formed on the side of a front face of the first optical section 412, and a plurality of horizontally arranged first lenses (convex lenses) 416 respectively corresponding to channels is formed in a bottom portion of the light entrance portion 415. This prevents the surface of the first lens 416 from unintendedly coming into contact with, for example, a counterpart connector and from being damaged.

Further, a concave or convex position regulator 417 used to align the connector 402 with the connector 202 is integrally formed on the side of the front face of the first optical section 412, where the position regulator 417 is convex in the illustrated example. This makes it possible to easily perform an optical-axis alignment when the connector 402 is connected to the connector 202. Note that the position regulator 417 is not limited to being formed integrally with the first optical section 412, and the formation may be performed using a pin or by another method.

A plurality of horizontally arranged optical fibers 401 respectively corresponding to channels is connected on the side of a rear face of the second optical section 413. In this case, ends of the respective optical fibers 401 are respectively inserted into optical fiber inserting holes 418 to fix the optical fibers 401. Further, an adhesive injection hole 414 that includes a rectangular opening is formed on the side of an upper face of the second optical section 413. An adhesive used to fix the optical fiber 401 to the second optical section 413 is injected through the adhesive injection hole 414.

Figure 39A:
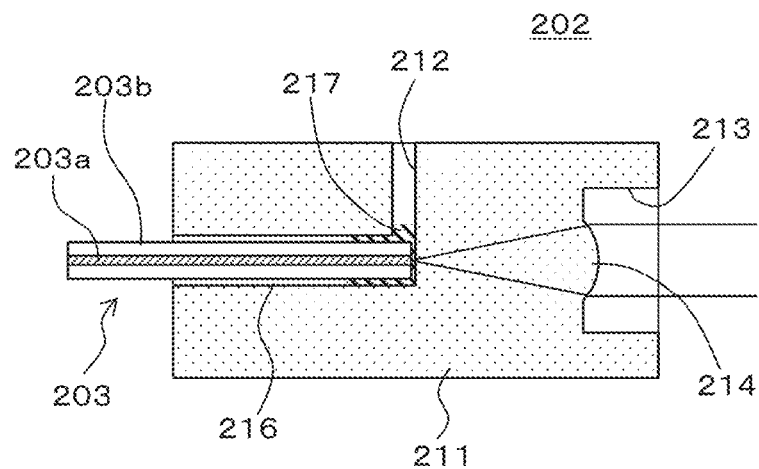
FIGS. 39A and 39B is a set of cross-sectional views illustrating examples of the connector of the transmitter and the connector of the cable.

FIG. 39A is a cross-sectional view illustrating an example of the connector 202 of the transmitter 200. An illustration of the position regulator 215 (refer to FIG. 37) is omitted in the illustrated example. The connector 202 is further described with reference to FIG. 39A.

The connector 202 includes the connector body 211. The connector body 211 is made of, for example, a light-transmissive material such as synthetic resin or glass, or a material, such as silicon, through which a specific wavelength is transmitted, and the connector body 211 is in the form of a ferrule with a lens.

It is possible to easily align an optical fiber with a lens with respect to an optical axis when the connector body 211 is in the form of a ferrule with a lens, as described above. Further, when the connector body 211 is in the form of a ferrule with a lens, as described above, a multichannel communication can be easily performed just by inserting an optical fiber into the ferrule.

The concave light exit portion (the light transmission space) 213 is formed on the side of the front face of the connector body 211. Further, the horizontally arranged lenses (convex lenses) 214 respectively corresponding to channels is formed integrally with the connector body 211 to be situated in the bottom portion of the light exit portion 213. Accordingly, the accuracy in positioning the lens 214 with respect to a core 203a of the optical fiber 203 placed in the connector body 211 can be simultaneously improved for a plurality of channels.

Further, a plurality of optical fiber inserting holes 216 horizontally arranged correspondingly to the lenses 214 for the respective channels is provided to the connector body 211, each optical fiber inserting hole 216 extending forward from the side of the rear face of the connector body 211. The optical fiber 203 has a two-layer structure including the core 203a and cladding 203b, the core 203a being a center portion that serves as a light path, the cladding 203b covering a peripheral surface of the core 203a.

The optical fiber inserting hole 216 for each channel is formed such that the core 203a of the optical fiber 203 inserted into the optical fiber inserting hole 216 coincides the optical axis of a corresponding lens 214. Further, the optical fiber inserting hole 216 for each channel is formed such that a bottom of the optical fiber inserting hole 216, that is, a contact portion of the optical fiber inserting hole 216 coincides a focal point of the lens 214, the contact portion of the optical fiber inserting hole 216 being a portion with which the end (an entrance end) of the optical fiber 203 is brought into contact when the optical fiber 203 is inserted into the optical fiber inserting hole 216.

Further, the adhesive injection hole 212 extending downward from the side of the upper face of the connector body 211 is formed in the connector body 211 such that the adhesive injection hole 212 communicates with a portion situated around the bottoms of the plurality of horizontally arranged optical fiber inserting holes 216. After the optical fiber 203 is inserted into the optical fiber inserting hole 216, an adhesive 217 is injected into a portion situated around the optical fiber 203 through the adhesive injection hole 212. This results in fixing the optical fiber 203 to the connector body 211.

In the connector 202 of the transmitter 200, the lens 214 operates to form light exiting the optical fiber 203 into collimated light and to cause the collimated light to exit. Accordingly, light that exits the exit end of the optical fiber 203 enters the lens 214, and is formed into collimated light, and then the collimated light exits the lens 214.

Figure 39B:
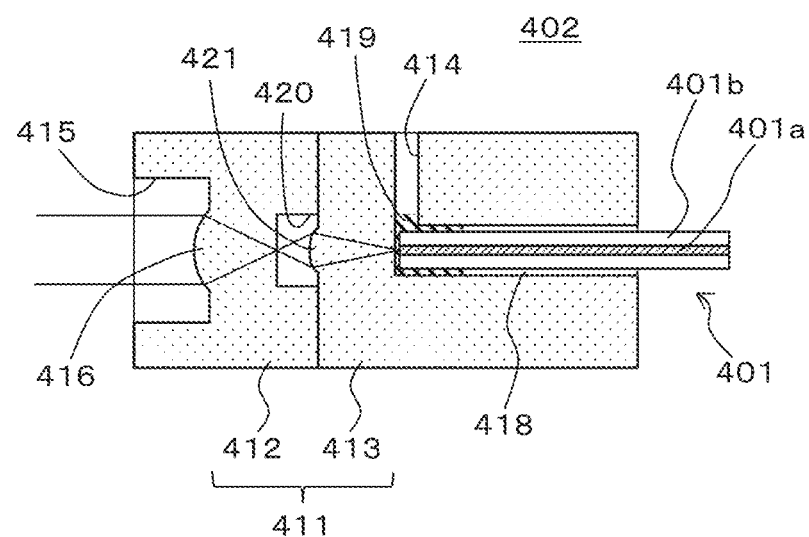

FIG. 39B is a cross-sectional view illustrating an example of the connector 402 of the cable 400. An illustration of the position regulator 417 (refer to FIGS. 37 and 38) is omitted in the illustrated example. The connector 402 is further described with reference to FIG. 39B.

The connector 402 includes the connector body 411 including the first optical section 412 and the second optical section 413 being connected to each other.

The first optical section 412 is made of, for example, a light-transmissive material such as synthetic resin or glass, or a material, such as silicon, through which a specific wavelength is transmitted. The concave light entrance portion (the light transmission space) 415 is formed on the side of the front face of the first optical section 412. Further, the horizontally arranged first lenses 416 respectively corresponding to channels is formed integrally with the first optical section 412 to be situated in the bottom portion of the light entrance portion 415. Accordingly, the accuracy in positioning the first lens 416 with respect to the first optical section 412 can be improved.

Further, a concave space 420 is formed on the side of a rear face of the first optical section 412. The space 420 is sealed with a front face of the second optical section 413 to become a sealed space. In this case, a second lens 421 for each channel is situated in the sealed space, the second lens 421 being formed on the side of the front face of the second optical section 413, which will be described later.

The second optical section 413 is made of, for example, a light-transmissive material such as synthetic resin or glass, or a material, such as silicon, through which a specific wavelength is transmitted, and second optical section 413 is in the form of a ferrule with a lens. The connector body 411 is configured by the second optical section 413 being connected to the first optical section 412, as described above. It is favorable that the second optical section 413 be made of the same material as the first optical section 412 since the misalignment of a light path due to the two optical sections being distorted when there is a thermal change, can be prevented by the two optical sections having the same coefficient of thermal expansion. However, the second optical section 413 may be made of a material different from the material of the first optical section 412.

It is possible to easily align optical axes of the optical fiber 401 and the second lens 421 when the second optical section 413 is in the form of a ferrule with a lens, as described above. Further, when the second optical section 413 is in the form of a ferrule with a lens, as described above, a multi-channel communication can be easily performed just by inserting the optical fiber 401 into the ferrule.

On the side of the front face of the second optical section 413, the horizontally arranged second lenses 421 respectively corresponding to channels are formed integrally with the second optical section 413. Accordingly, the accuracy in positioning the second lens 421 with respect to a core 401a of the optical fiber 401 placed in the second optical section 413 can be simultaneously improved for a plurality of channels.

Further, a plurality of optical fiber inserting holes 418 horizontally arranged correspondingly to the second lenses 421 for the respective channels is provided to the second optical section 413, each optical fiber inserting hole 418 extending forward from the side of the rear face of the second optical section 413. The optical fiber 401 has a two-layer structure including the core 401a and cladding 401b, the core 401a being a center portion that serves as a light path, the cladding 401b covering a peripheral surface of the core 401a.

The optical fiber inserting hole 418 for each channel is formed such that the core 401a of the optical fiber 401 inserted into the optical fiber inserting hole 418 coincides the optical axis of a corresponding second lens 421. Further, the optical fiber inserting hole 418 for each channel is formed such that a bottom of the optical fiber inserting hole 418, that is, a contact portion of the optical fiber inserting hole 418 coincides a focal point of the second lens 421, the contact portion of the optical fiber inserting hole 418 being a portion with which the end (an entrance end) of the optical fiber 401 is brought into contact when the optical fiber 401 is inserted into the optical fiber inserting hole 418.

Further, the adhesive injection hole 414 extending downward from the side of the upper face of the second optical section 413 is formed in the second optical section 413 such that the adhesive injection hole 414 communicates with a portion situated around the bottoms of the plurality of horizontally arranged optical fiber inserting holes 418. After the optical fiber 401 is inserted into the optical fiber inserting hole 418, an adhesive 419 is injected into a portion situated around the optical fiber 401 through the adhesive injection hole 414. This results in fixing the optical fiber 401 to the second optical section 413.

As described above, the connector body 411 is configured by the first optical section 412 and the second optical section 413 being connected to each other. For example, a method including newly forming a concave portion such as a boss in one of the two optical sections, newly forming a convex portion in the other optical section, and then performing fitting; or a method including aligning optical axes of lenses using, for example, an image processing system, and then performing bonding and fixation may be adopted as a method for the connection described above.

In the connector 402, the first lens 416 operates to collect entering collimated light. Further, the second lens 421 operates to adjust a path of entering light such that the light is guided to the core 401a of the optical fiber 401 (refer to FIG. 18). In this case, the collimated light enters the first lens 416, and is collected by the first lens 416. The collected light enters the entrance end of the optical fiber 401 through the second lens 421.

Figure 40:
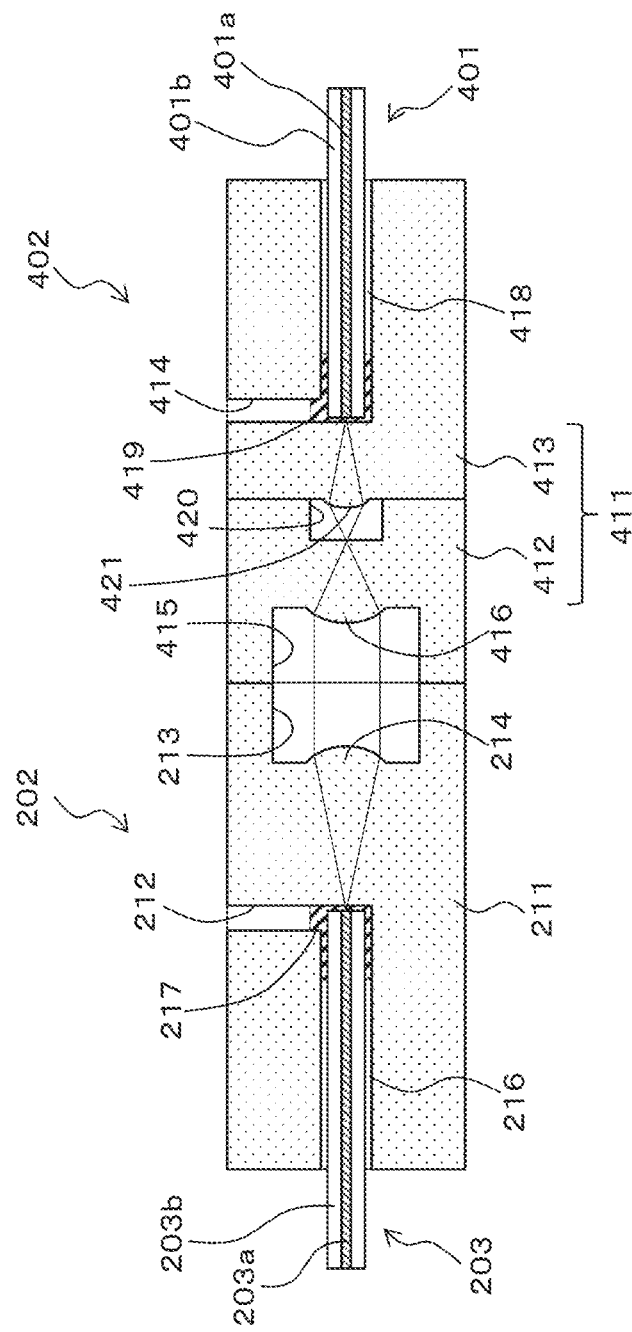
FIG. 40 is a cross-sectional view illustrating the connector of the transmitter and the connector of the cable being connected to each other.

FIG. 40 is a cross-sectional view illustrating the connector 202 of the transmitter 200 and the connector 402 of the cable 400 being connected to each other. In the connector 202, light transmitted through the optical fiber 203 exits the exit end of the optical fiber 203 with a specified NA. The exiting light enters the lens 214, and is formed into collimated light. The collimated light exits the lens 214 toward the connector 402.

Further, in the connector 402, the light exiting the connector 202 enters the first lens 416, and is collected by the first lens 416. Then, the collected light enters the entrance end of the optical fiber 401 through the second lens 421, and is transmitted through the optical fiber 401.

Note that the connector 403 of the cable 400 and the connector 301 of the receiver 300 illustrated in FIG. 36 have a configuration similar to the above-described example of the configuration of the connector 202 of the transmitter 200 and the connector 402 of the cable 400, although a detailed description thereof is omitted.

2. Modifications

The example in which the first wavelength is 1310 nm has been described in the embodiments above. However, a laser light source or an LED light source may be used as a light source. Thus, the first wavelength may be a wavelength of, for example, between 300 nm and 5 μm.

Further, the first wavelength may be a wavelength in the 1310 nm band including 1310 nm, although the example in which the first wavelength is 1310 nm has been described in the embodiments above. Furthermore, the first wavelength may be 1550 nm, or may be a wavelength in the 1550 nm band including 1550 nm, although the example in which the first wavelength is 1310 nm has been described in the embodiments above. Moreover, the second wavelength may be a wavelength in the 850 nm band including 850 nm, although the example in which the second wavelength is 850 nm has been described in the embodiments above.

Further, of course, the present technology is also appliable when the optical waveguide is an optical waveguide other than an optical fiber such as a silicon optical waveguide, although the example in which the optical waveguide is an optical fiber has been described in the embodiments above.

The favorable embodiments of the present disclosure have been described above in detail with reference to the accompanying drawings. However, the technical scope of the present disclosure is not limited to these examples. It is clear that persons who have common knowledge in the technical field of the present disclosure could conceive various alterations or modifications within the scope of a technical idea according to an embodiment of the present disclosure. It is understood that of course such alterations or modifications also fall under the technical scope of the present disclosure.

Further, the effects described herein are not limitative, but are merely descriptive or illustrative. In other words, the technology according to the present disclosure may provide other effects apparent to those skilled in the art from the description herein, in addition to, or instead of the effects described above.

Note that the present technology may also take the following configurations.

(1) An optical communication apparatus, including
an optical waveguide that performs propagation only in a reference mode at a first wavelength, the optical communication apparatus performing communication using light that has a second wavelength and includes a component of at least a first order mode in addition to a component of the reference mode, the second wavelength being a wavelength that enables the optical waveguide to perform propagation in at least the first order mode in addition to the reference mode.

(2) The optical communication apparatus according to (1), further including
a light path adjuster that adjusts a light path such that input light is guided to a core of the optical waveguide.

(3) The optical communication apparatus according to (2), in which
the light path adjuster adjusts the light path due to light being refracted by a lens.

(4) The optical communication apparatus according to (2), in which
the light path adjuster adjusts the light path due to light being reflected off a light path adjusting member that includes a tapered surface in which a diameter is gradually decreased toward an entrance side of the optical waveguide.

(5) The optical communication apparatus according to (2), in which
the light path adjuster is provided between the core and cladding at an entrance end of the optical waveguide, and
the light path adjuster adjusts the light path using a light path adjusting member that includes a surface in contact with the cladding, the surface being a surface in which a diameter sized equally to a diameter of the core is gradually increased, the light path adjusting member having a refractive index that is gradually changed in a direction from the core to the cladding, from a refractive index equal to a refractive index of the core to a refractive index equal to a refractive index of the cladding.

(6) The optical communication apparatus according to (2), in which
the light path adjuster is provided on an entrance side of the optical waveguide, and
the light path adjuster adjusts the light path using a light path adjusting member that has a refractive index having a gradation structure in which the light path adjusting member has, on an optical axis, a refractive index equal to a refractive index of the core of the optical waveguide, and the light path adjusting member has a refractive index lower at a position, in the light path adjusting member, that is situated vertically further away from the optical axis.

(7) The optical communication apparatus according to any one of (1) to (6), in which
the first wavelength is a wavelength at which a wavelength dispersion is zero.

(8) The optical communication apparatus according to any one of (1) to (7), in which
the first wavelength is a wavelength of between 300 nm and 5 μm.

(9) The optical communication apparatus according to (8), in which
the first wavelength is a wavelength in a 1310 nm band or a wavelength in a 1550 nm band.

(10) The optical communication apparatus according to any one of (1) to (9), in which
the second wavelength is a wavelength in an 850 nm band.

(11) The optical communication apparatus according to any one of (1) to (10), in which
the optical waveguide is an optical fiber.

(12) The optical communication apparatus according to any one of (1) to (10), in which
the optical waveguide is a silicon optical waveguide.

(13) An optical communication method that is performed by an optical communication apparatus that includes an optical waveguide that performs propagation only in a reference mode at a first wavelength, the optical communication method including
performing communication using light that has a second wavelength and includes a component of at least a first order mode in addition to a component of the reference mode, the second wavelength being a wavelength that enables the optical waveguide to perform propagation in at least the first order mode in addition to the reference mode.

(14) The optical communication method according to (13), further including
adjusting a light path such that input light is guided to a core of the optical waveguide.

(15) An optical communication system, including:
a reception section that includes an optical waveguide that performs propagation only in a reference mode at a first wavelength; and
a transmission section from which light that has a second wavelength enters the optical waveguide of the reception section, the light including a component of at least a first order mode in addition to a component of the reference mode, the second wavelength being a wavelength that enables the optical waveguide to perform propagation in at least the first order mode in addition to the reference mode.

(16) The optical communication system according to (15), further including
a light path adjuster that adjusts a light path such that input light is guided to a core of the optical waveguide.

(17) The optical communication system according to (15) or (16), in which
the transmission section is a receptacle of a transmitter, or a plug of a cable.

REFERENCE SIGNS LIST

10T, 10R optical fiber
10a core
10b cladding
11T, 11R lens
12R lens
13R light path adjusting member
13a tapered surface
13R_1 center portion
13R_2 outer peripheral portion
14R light path adjusting member
14a tapered surface
14b cylindrical surface 19R light path adjusting member
19a tapered surface
19b funnel-shaped space
21R light path adjusting member
21a tapered surface
21b cylindrical surface
22R light path adjusting member
100 transmission-and-reception system
200 transmitter
201 light-emitting section
202 connector (receptacle)
203 optical fiber
203a core
203b cladding
211 connector body
212 adhesive injection hole
213 light exit portion (light transmission space)
214 lens (convex lens)
215 position regulator
216 optical fiber inserting hole
217 adhesive
300 receiver
301 connector (receptacle)
302 light-receiving section
303 optical fiber
400 cable
401 optical fiber
401a core
401b cladding
402, 403 connector (plug)
411 connector body
412 first optical section
413 second optical section
414 adhesive injection hole
415 light entrance portion (light transmission space)
416 first lens (convex lens)
417 position regulator
418 optical fiber inserting hole
419 adhesive
420 convex space
421 second lens (convex lens)

The invention claimed is:

1. An optical communication apparatus, comprising an optical waveguide that performs propagation only in a reference mode at a first wavelength, the optical communication apparatus performing communication using light that has a second wavelength and includes a component of at least a first order mode in addition to a component of the reference mode, the second wavelength being a wavelength that enables the optical waveguide to perform propagation in at least the first order mode in addition to the reference mode.

2. The optical communication apparatus according to claim 1, further comprising a light path adjuster that adjusts a light path such that input light is guided to a core of the optical waveguide.

3. The optical communication apparatus according to claim 2, wherein the light path adjuster adjusts the light path due to light being refracted by a lens.

4. The optical communication apparatus according to claim 2, wherein the light path adjuster adjusts the light path due to light being reflected off a light path adjusting member that includes a tapered surface in which a diameter is gradually decreased toward an entrance side of the optical waveguide.

5. The optical communication apparatus according to claim 2, wherein the light path adjuster is provided between the core and cladding at an entrance end of the optical waveguide, and the light path adjuster adjusts the light path using a light path adjusting member that includes a surface in contact with the cladding, the surface being a surface in which a diameter sized equally to a diameter of the core is gradually increased, the light path adjusting member having a refractive index that is gradually changed in a direction from the core to the cladding, from a refractive index equal to a refractive index of the core to a refractive index equal to a refractive index of the cladding.

6. The optical communication apparatus according to claim 2, wherein the light path adjuster is provided on an entrance side of the optical waveguide, and the light path adjuster adjusts the light path using a light path adjusting member that has a refractive index having a gradation structure in which the light path adjusting member has, on an optical axis, a refractive index equal to a refractive index of the core of the optical waveguide, and the light path adjusting member has a refractive index lower at a position, in the light path adjusting member, that is situated vertically further away from the optical axis.

7. The optical communication apparatus according to claim 1, wherein the first wavelength is a wavelength at which a wavelength dispersion is zero.

8. The optical communication apparatus according to claim 1, wherein the first wavelength is a wavelength of between 300 nm and 5 µm.

9. The optical communication apparatus according to claim 8, wherein the first wavelength is a wavelength in a 1310 nm band or a wavelength in a 1550 nm band.

10. The optical communication apparatus according to claim 1, wherein the second wavelength is a wavelength in an 850 nm band.

11. The optical communication apparatus according to claim 1, wherein the optical waveguide is an optical fiber.

12. The optical communication apparatus according to claim 1, wherein the optical waveguide is a silicon optical waveguide.

13. An optical communication method that is performed by an optical communication apparatus that includes an optical waveguide that performs propagation only in a reference mode at a first wavelength, the optical communication method comprising performing communication using light that has a second wavelength and includes a component of at least a first order mode in addition to a component of the reference mode, the second wavelength being a wavelength that enables the optical waveguide to perform propagation in at least the first order mode in addition to the reference mode.

14. The optical communication method according to claim 13, further comprising adjusting a light path such that input light is guided to a core of the optical waveguide.

15. An optical communication system, comprising:
- a reception section that includes an optical waveguide that performs propagation only in a reference mode at a first wavelength; and
- a transmission section from which light that has a second wavelength enters the optical waveguide of the reception section, the light including a component of at least a first order mode in addition to a component of the reference mode, the second wavelength being a wavelength that enables the optical waveguide to perform propagation in at least the first order mode in addition to the reference mode.

16. The optical communication system according to claim 15, further comprising
- a light path adjuster that adjusts a light path such that input light is guided to a core of the optical waveguide.

17. The optical communication system according to claim 15, wherein
- the transmission section is a receptacle of a transmitter, or a plug of a cable.

* * * * *